US012166295B2

(12) United States Patent
Pandey et al.

(10) Patent No.: US 12,166,295 B2
(45) Date of Patent: Dec. 10, 2024

(54) ELECTROMAGNETIC WAVEGUIDE

(71) Applicant: ROGERS CORPORATION, Chandler, AZ (US)

(72) Inventors: Shailesh Pandey, Woburn, MA (US); Kristi Pance, Auburndale, MA (US); Roshin Rose George, Burlington, MA (US); Sara G. Canzano, Boston, MA (US); Daniel Pennock, Salem, MA (US); Karl Edward Sprentall, Medford, MA (US); Lori Brock, Ipswich, MA (US); Gianni Taraschi, Arlington, MA (US)

(73) Assignee: ROGERS CORPORATION, Chandler, AZ (US)

( * ) Notice: Subject to any disclaimer, the term of this patent is extended or adjusted under 35 U.S.C. 154(b) by 145 days.

(21) Appl. No.: 17/942,896

(22) Filed: Sep. 12, 2022

(65) Prior Publication Data

US 2023/0078966 A1 Mar. 16, 2023

Related U.S. Application Data

(60) Provisional application No. 63/243,995, filed on Sep. 14, 2021.

(51) Int. Cl.

*H01Q 9/04* (2006.01)
*H01Q 15/08* (2006.01)
*H01Q 21/06* (2006.01)

(52) U.S. Cl.

CPC .......... *H01Q 9/0485* (2013.01); *H01Q 15/08* (2013.01); *H01Q 21/065* (2013.01)

(58) Field of Classification Search

CPC .. H01Q 9/0485; H01Q 13/0225; H01Q 15/08; H01Q 19/08; H01Q 21/0043; H01Q 21/065; H01Q 21/08

See application file for complete search history.

(56) References Cited

U.S. PATENT DOCUMENTS

| | | | |
|---|---|---|---|
| 5,517,203 | A | 5/1996 | Fiedziuszko |
| 7,161,555 | B2 | 1/2007 | Ohno et al. |
| 7,423,604 | B2 | 9/2008 | Nagai |
| 10,651,567 | B2 | 5/2020 | Kamo et al. |
| 2013/0120205 | A1 | 5/2013 | Thomson et al. |
| 2018/0024226 | A1 | 1/2018 | Izadian |
| 2018/0323514 | A1 | 11/2018 | Pance et al. |

OTHER PUBLICATIONS

Ding, et al., "A 4 × 4 Ridge Substrate Integrated Waveguide (RSIW) Slot Array Antenna" IEEE Antennas and Wireless Propagation Letters, Jan. 2009, vol. 8 (561-564).

(Continued)

*Primary Examiner* — Hoang V Nguyen

(74) *Attorney, Agent, or Firm* — CANTOR COLBURN LLP

(57) ABSTRACT

An electromagnetic, EM, apparatus, includes: a first portion having an EM signal feed; and a second portion disposed on the first portion, the second portion having a shaped metallized form having at least one shaped metallized cavity, the second portion further having a dielectric medium disposed within each of the at least one shaped metallized cavity such that respective ones of the dielectric medium has a 3D shape that conforms to a shape of a corresponding one of the at least one shaped metallized cavity.

20 Claims, 31 Drawing Sheets

(56) References Cited

OTHER PUBLICATIONS

International Search Report mailed Feb. 3, 2023, International Application No. PCT/US2022/043354; International Filing Date Sep. 13, 2022 (7 pgs).

Shad, et al., "A Compact and High Gain Dielectric-Loaded 60GHz Multi-Stepped Waveguid Antenna Array" 2019 IEEE International Symposium on Antennas and Propagation and USNC-URSI Radio Science Meeting Jul. 2019 (1413-1414).

Written Opinion mailed Feb. 3, 2023, International Application No. PCT/US2022/043354; International Filing Date Sep. 13, 2022 (27 pgs).

FIG. 3A
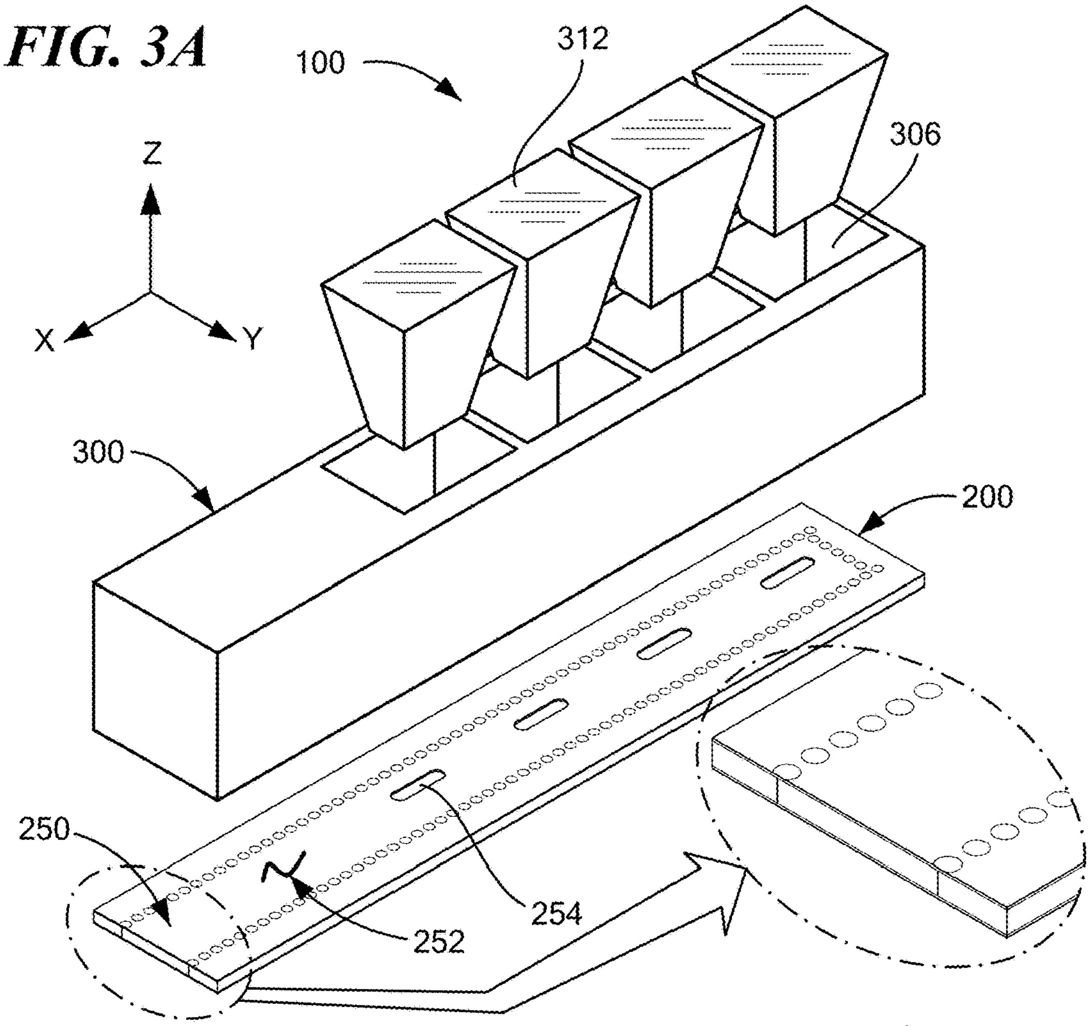
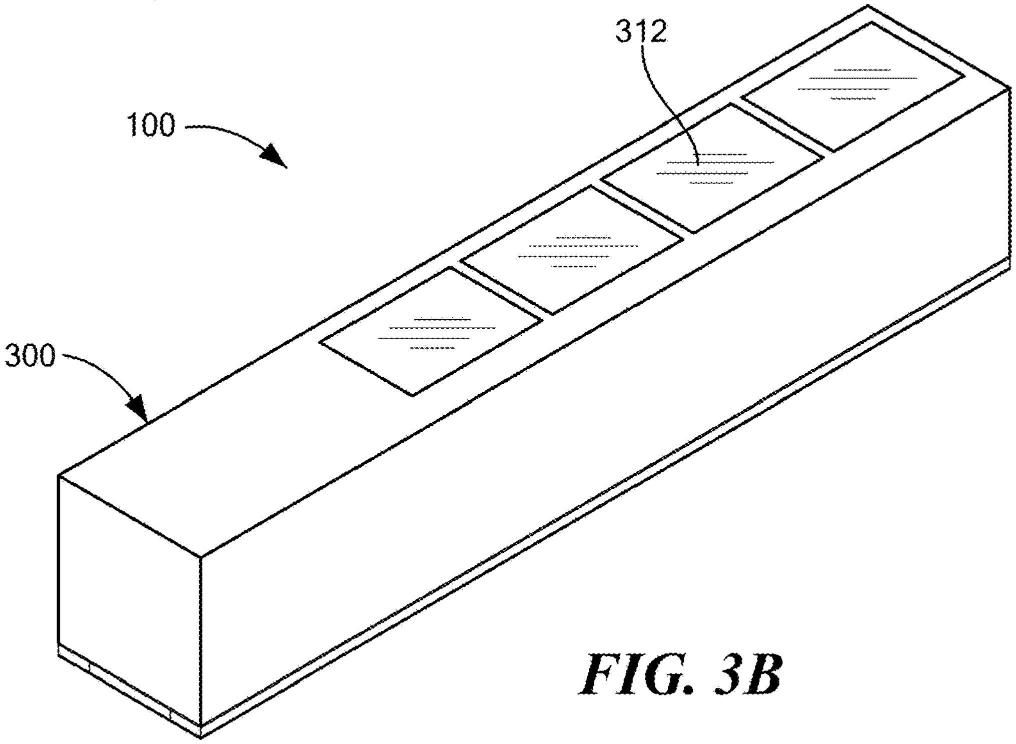
FIG. 3B

| Name | Theta | Ang | Mag |
|---|---|---|---|
| m1 | 0.0000 | 0.0000 | 10.5532 |

ELECTROMAGNETIC WAVEGUIDE

CROSS REFERENCE TO RELATED APPLICATIONS

This application claims the benefit of U.S. Provisional Application Ser. No. 63/243,995, filed Sep. 14, 2021, which is incorporated herein by reference in its entirety.

BACKGROUND

The present disclosure relates generally to an electromagnetic, EM, apparatus, particularly to an EM waveguide, and more particularly to an EM waveguide having dielectric loading.

EM waveguides are generally well known in the art of electromagnetic field theory and associated apparatus.

While existing EM waveguides may be suitable for their intended purpose, there remains a need in the art for an EM waveguide that provides improved performance with reduced size.

BRIEF SUMMARY

An embodiment includes an EM apparatus as defined by the appended independent claims. Further advantageous modifications of the EM apparatus are defined by the appended dependent claims.

An embodiment includes an electromagnetic, EM, apparatus, having: a first portion having a first mating surface; and a second portion having a second mating surface configured to be disposed on the first mating surface of the first portion; wherein the first portion has an overall height H1, the first portion having: an open-top structure having an upper surface profile having at least one top-down cavity having air and having a depth d1 where d1<H1; wherein each of the at least one top-down cavity has corresponding side walls; wherein outer exposed surfaces of the at least one top-down cavity with the corresponding side walls comprises an electrical conductor; wherein corresponding ones of the at least one top-down cavity with the corresponding side walls forms a lower portion of an air waveguide, AWG; wherein the second portion has an overall height H2, the second portion having: a lower surface profile configured to mate with the upper surface profile of the first portion; an upper surface profile having at least one top-down recess having a corresponding floor at a depth d2 where d2<H2; a bottom opening in each respective floor of the at least one top-down recess; wherein each of the at least one top-down recess is at least partially filled with a dielectric medium having a relative dielectric constant greater than that of air that covers the corresponding bottom opening; wherein portions of the lower surface profile proximate each bottom opening comprises an electrical conductor and forms an upper portion of the AWG.

An embodiment includes an electromagnetic, EM, apparatus, having: a first portion having an EM signal feed; and a second portion disposed on the first portion, the second portion having a shaped metallized form having at least one shaped metallized cavity, the second portion further having a dielectric medium disposed within each of the at least one shaped metallized cavity such that respective ones of the dielectric medium has a 3D shape that conforms to a shape of a corresponding one of the at least one shaped metallized cavity.

An embodiment includes an electromagnetic, EM, apparatus, having: an EM signal feed; an air waveguide, AWG, disposed in signal communication with the EM signal feed; and at least one dielectric loaded launch disposed in signal communication with and between the EM signal feed and the AWG.

An embodiment includes electromagnetic, EM, apparatus, having: an EM signal feed; an air waveguide, AWG, having a plurality of antenna ports, and an EM divider network disposed in signal communication with and between the plurality of antenna ports and the EM signal feed, the EM divider network providing a power dividing signal path between corresponding ones of the plurality of antenna ports and the EM signal feed; and a plurality of dielectric loaded medium disposed at, and in one to one correspondence with, the plurality of antenna ports.

An embodiment includes an electromagnetic, EM, apparatus, having: a first portion having: an air waveguide, AWG, having electrically conductive internal surfaces; a ridge projection that extends lengthwise within the AWG, the ridge projection having electrically conductive surfaces within the AWG; a first plurality of wall projections that extend at least partially across a gap between a top surface and a bottom surface of the AWG, the first plurality of wall projections being disposed on one side of the ridge projection and distributed in a direction parallel to the ridge projection, the first plurality of wall projections having electrically conductive surfaces within the AWG; a second plurality of wall projections that extend at least partially across a gap between a top surface and a bottom surface of the AWG, the second plurality of wall projections being disposed on an opposing side of the ridge projection and distributed in a direction parallel to the ridge projection, the second plurality of wall projections having electrically conductive surfaces within the AWG; wherein an upper surface of the AWG comprises; a first aperture disposed between the ridge projection and the first plurality of wall projections on a first side of the ridge projection, and a second aperture disposed between the ridge projection and the second plurality of wall projections on a second opposing side of the ridge projection; wherein the second aperture is longitudinally displaced relative to the first aperture along a length of the AWG such that the first and second apertures are not directly across from each other on opposing sides of the ridge projection.

An embodiment includes an electromagnetic, EM, apparatus, having: an air waveguide, AWG, having: as viewed in an axial cross section of the AWG, an elongated housing having a contiguous arrangement of a floor, a first wall, a ceiling, and a second wall, wherein the floor, the first wall, the ceiling, and the second wall, each comprise an electrically conductive material, the housing having a distance H between the floor and the ceiling; as viewed in the axial cross section of the AWG, a centrally disposed elongated ridge that extends from the floor, wherein outer surfaces of the ridge comprise an electrically conductive material, the ridge having a height h where h<H; a first signal port disposed at a first end of the AWG; a second signal port disposed at a second end of the AWG, the second end disposed at a distance from the first end; a first aperture at the first signal port that extends contiguously through the floor and the ridge; and a second aperture at the second signal port that extends contiguously through the floor and the ridge.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike in the accompanying Figures:

FIGS. 3A and 3B respectively depict; the example upper portion of FIG. 2A in expanded assembly view with an example lower portion of the EM apparatus of FIG. 1A, and a repeat view of the completed assembly of FIG. 2B, in accordance with an embodiment;

Figure 1A:
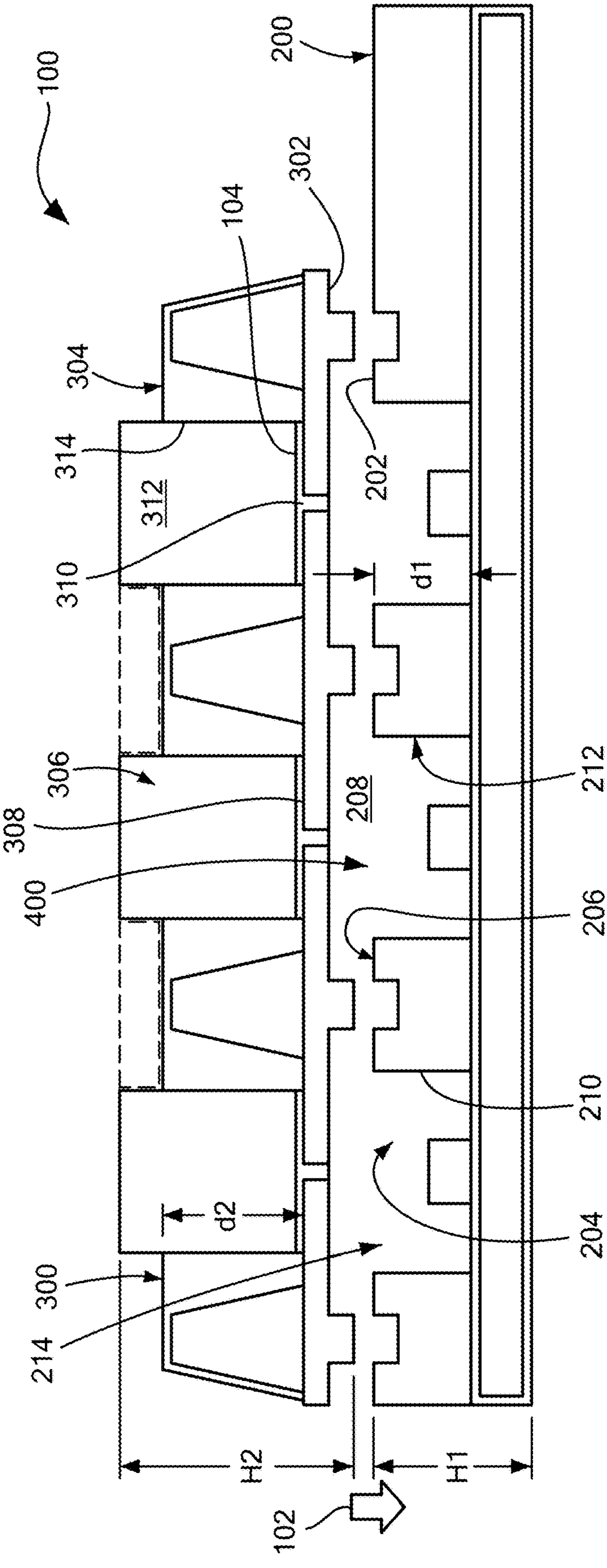
FIGS. 1A and 1B depict identical front cross section views of an example EM apparatus, in accordance with an embodiment.

One skilled in the art will understand the drawings, described herein below, are for illustration purposes only. It will be appreciated that for simplicity and clarity of illustration, elements shown in the figures have not necessarily been drawn to scale. For example, the dimensions or scale of some of the elements may be exaggerated relative to other elements for clarity. Further, where considered appropriate, reference numerals may be repeated among the figures to indicate corresponding or analogous elements, or analogous elements may not be repetitively enumerated in all figures but would be recognized by one skilled in the art as being explicitly disclosed.

DETAILED DESCRIPTION

As used herein, the phrase "embodiment" means "embodiment disclosed and/or illustrated herein", which may not necessarily encompass a specific embodiment of an invention in accordance with the appended claims, but nonetheless is provided herein as being useful for a complete understanding of an invention in accordance with the appended claims.

Although the following detailed description contains many specifics for the purposes of illustration, anyone of ordinary skill in the art will appreciate that many variations and alterations to the following details are within the scope of the appended claims. For example, where described features may not be mutually exclusive of and with respect to other described features, such combinations of non-mutually exclusive features are considered to be inherently disclosed herein. Additionally, common features may be commonly illustrated in the various figures but may not be specifically enumerated in all figures for simplicity, but would be recognized by one skilled in the art as being an explicitly disclosed feature even though it may not be enumerated in a particular figure. Accordingly, the following example embodiments are set forth without any loss of generality to, and without imposing limitations upon, the claimed invention disclosed herein.

An embodiment, as shown and described by the various figures and accompanying text, provides an EM apparatus, which in an embodiment is an assembled assembly, having a first lower portion and a second upper portion, wherein the first and second portions form an air waveguide, AWG, therebetween, wherein the AWG includes strategically placed dielectric loading for enhanced performance.

FIG. 1A depicts a front cross section view of an example EM apparatus 100 having a first (lower) portion 200 having a first mating surface 202, and a second (upper) portion 300 having a second mating surface 302 configured to be disposed on the first mating surface 202 of the first portion 200 in the direction of arrow 102. The second portion 300 is attached to the first portion 200 at the first and second surfaces 202, 302. The first portion 200 has an overall height H1. In an embodiment, the first portion 200 has an open-top structure 204 having an upper surface profile 206 having at least one top-down cavity 208 that has air therein. The at least one top-down cavity 208 has a depth d1 where d1<H1. Each of the at least one top-down cavity 208 has corresponding side walls 210, wherein outer exposed surfaces 212 of the at least one top-down cavity 208 with the corresponding side walls 210 has an electrical conductor disposed thereon, or is fabricated to have an electrically conductive surface disposed thereon. In an embodiment, the first portion 200 is be formed of a metallized plastic. In an embodiment, corresponding ones of the at least one top-down cavity 208 with the corresponding side walls 210 forms a lower portion 214 of an air waveguide, AWG 400. The second portion 300 has an overall height H2. In an embodiment, the second portion 300 has a lower surface profile 302 configured to mechanically mate with the upper surface profile 206 of the first portion 200, and an upper surface profile 304 having at least one top-down recess 306 having a corresponding floor 308 at a depth d2 where d2<H2. In an embodiment, the second portion 300 further includes a bottom opening 310 in each respective floor 308 of the at least one top-down recess 306. In an embodiment, each of the at least one top-down recess 306 is at least partially filled with a dielectric medium 312 having a relative dielectric constant greater than that of air that covers the corresponding bottom opening 310. In an embodiment, the dielectric medium 312 is disposed on and adhered to the floor 308 by an adhesive 104, wherein the corresponding dielectric medium 312, adhesive 104, or combination of dielectric medium 312 and adhesive 104, is disposed on the corresponding floor 308 of each respective top-down recess 306 and in each bottom opening 310 of each corresponding floor 308. In an embodiment, portions of the lower surface 302 profile proximate each bottom opening 310 has an electrical conductor or electrically conductive surface disposed thereon, or is fabricated to have an electrically conductive surface disposed thereon, and forms an upper portion of the AWG 400. In an embodiment, the second portion 300 is formed of a metallized plastic. In an embodiment, the dielectric medium 312 may be a dielectric resonator antenna, DRA, a lens or EM beam shaper, or a loaded dielectric for impedance matching or otherwise performance enhancement. In an embodiment, one or both of the first portion and the second portion is formed of a composite of multiple portions attached to each other.

In an embodiment, each top-down recess 306 has a wall 314 that substantially or completely surrounds a respective one of the dielectric medium 312 disposed therein, and surfaces of the at least one top-down recess 306, including the corresponding surrounding wall 314 and corresponding floor 308, has an electrical conductor or electrically conductive surface disposed thereon, or are otherwise fabricated to have an electrically conductive surface disposed thereon. In an embodiment, the surrounding wall 314, with the electrical conductor, of each respective top-down recess 306 forms an electrically conductive electromagnetic, EM, reflector (also herein referred to by reference numeral 306) that substantially or completely surrounds the dielectric medium 312 disposed within the corresponding top-down recess 306.

Figure 1B:
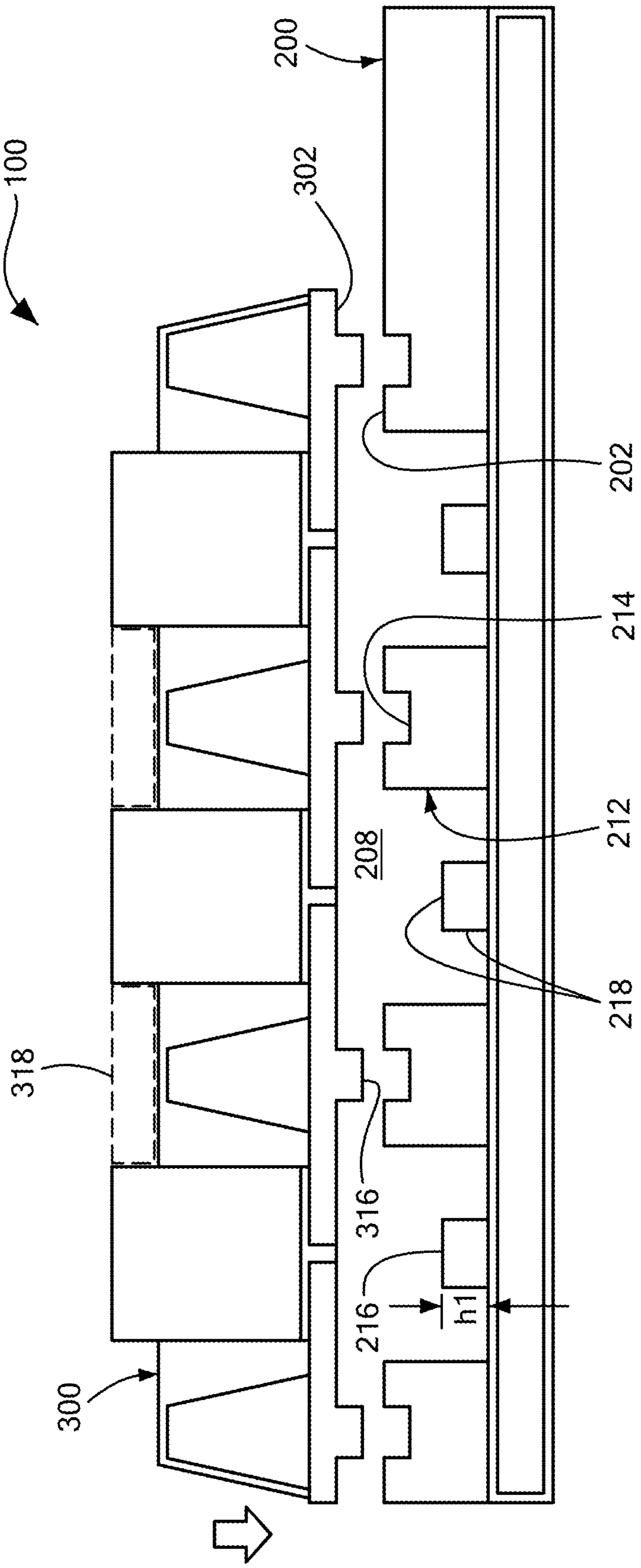

FIG. 1B depicts an identical front cross section view as that of FIG. 1A, and is presented independent of FIG. 1A for clarity, but would be appreciated by one skilled in the art to be complementary to FIG. 1A where like features should be viewed as being numbered alike. In an embodiment, and in addition to the foregoing description of FIG. 1A, the first portion 200, at a top surface (see first mating surface 202) of the side walls (see outer exposed surfaces 212) of corresponding ones of the at least one top-down cavity 208, further has an interlocking engagement feature 214, and the second portion 300, at the lower surface (see lower surface profile 302) of the second portion 300 proximate the interlocking engagement feature 214 of the first portion 200, further has a complementary interlocking engagement element 316 configured to interlock with a corresponding interlocking engagement feature 214 of the first portion 200.

In an embodiment, the interlocking engagement feature 214 of the first portion 200 forms an engagement recess, and wherein the complementary interlocking engagement element 316 of the second portion 300 forms an engagement projection structurally configured to fittingly engage with the engagement recess 214 of the first portion 200.

In an embodiment and with reference to FIGS. 1A and 1B in combination, the first portion 200 also includes a ridge projection 216 having a height h1, where h1<d1, disposed within each of the at least one top-down cavity 208, the ridge projection 216 having electrically conductive surfaces 218, on the sides and top for example. In an embodiment, each respective ridge projection 216 is disposed in an opposing structural relationship with a corresponding one of the bottom opening 310 in each respective floor 308 of the at least one top-down recess 306 of the second portion 300. In an embodiment, each of the bottom opening 310 in each respective floor 308 of the at least one top-down recess 306 forms an electromagnetic, EM, signal feed aperture.

In an embodiment, each of the dielectric medium 312 is integrally connected to another adjacent one of the dielectric medium 312 by a relatively thin connecting structure 318 to form a monolithic dielectric medium structure. In an embodiment, the relatively thin connecting structure 318 has an overall height dimension that is less than an overall height dimension of the dielectric medium 312, and has an overall depth dimension (into the plane of FIG. 1B) that is less than an overall depth dimension of the dielectric medium 312. In an embodiment, the overall height dimension and the overall depth dimension of the relatively thin connecting structure 318 is less than $\lambda/2$, where $\lambda$ is the wavelength at an operational frequency of the EM apparatus 100. In an embodiment the EM apparatus 100 is operational at a frequency range of: equal to or greater than 1 GHz and equal to or less than 1,000 GHz; alternatively, equal to or greater than 8 GHz and equal to or less than 300 GHz; further alternatively, equal to or greater than 50 GHz and equal to or less than 300 GHz.

In an embodiment, the second portion 300 is formed completely of metal, or is formed from a metal-coated dielectric material, or is formed from a metal-coated molded or 3D printed dielectric material.

Figure 2A:
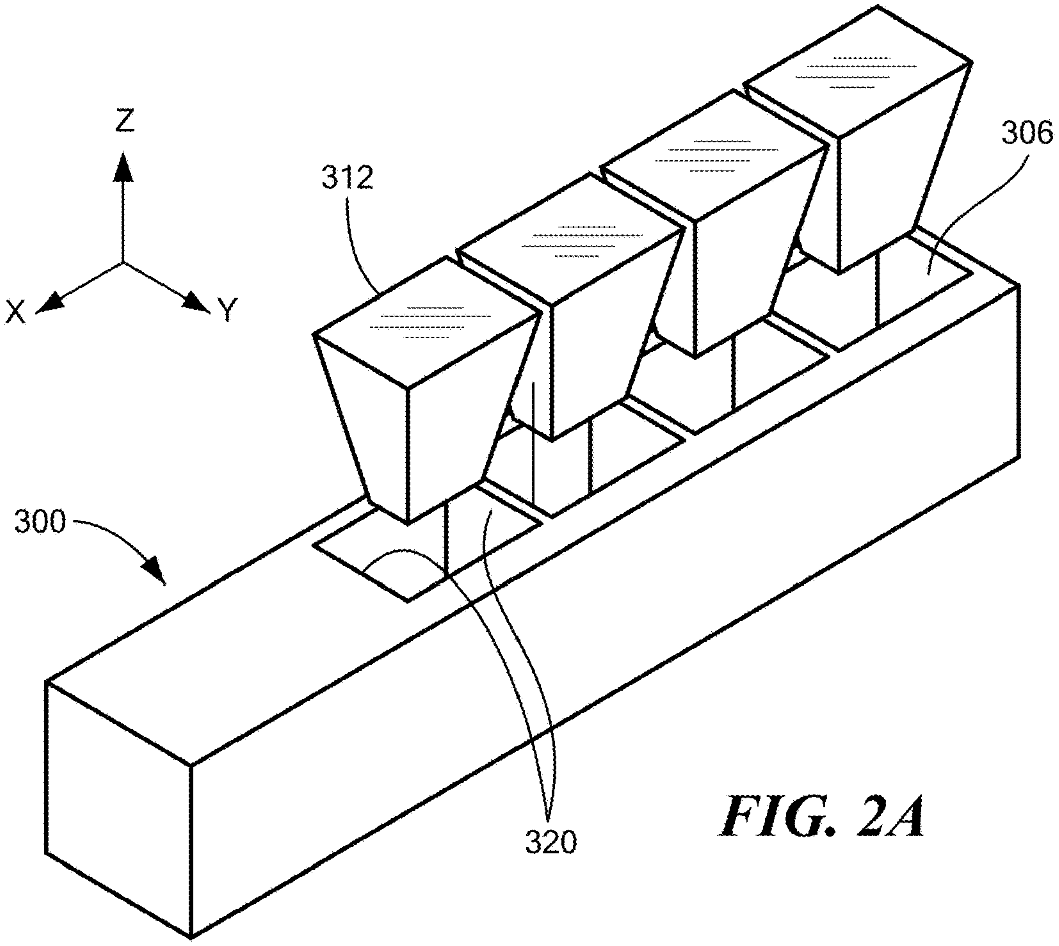
FIGS. 2A and 2B respectively depict; a rotated isometric view of a partially assembled assembly of an example upper portion of the EM apparatus of FIG. 1A, and a rotated isometric view of a completed assembly of the example upper portion of the EM apparatus of FIG. 1A, in accordance with an embodiment.
Figure 2B:
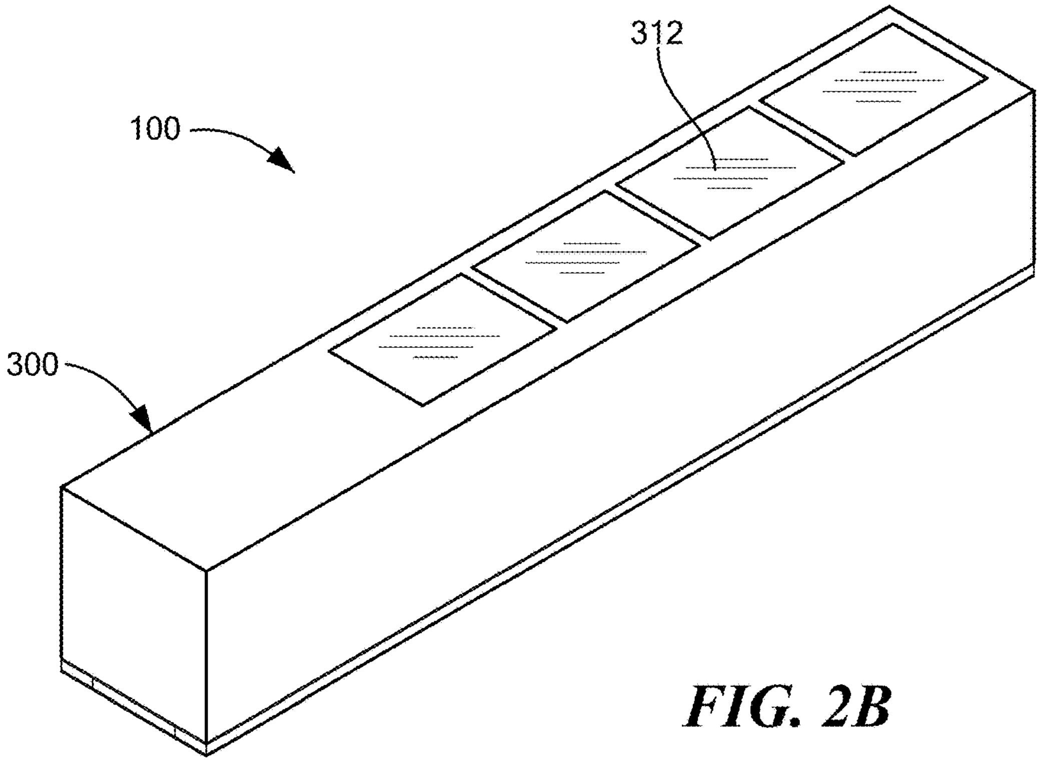

Reference is now made to FIGS. 2A-2B, in combination with the foregoing figures, where FIGS. 2A-2B depict two rotated isometric views in various stages of assembly of an example upper second portion 300 of the EM apparatus 100 of FIG. 1A. In an embodiment, the EM apparatus 100 includes an arrangement wherein each of the at least one top-down recess 306 of the second portion 300 has tapered sidewalls 320 that taper inward from top-to-bottom, and wherein each of the dielectric medium 312 has a 3D shape that conforms to the tapered sidewalls 320 of a corresponding one of the at least one top-down recess 306. In an embodiment, each of the dielectric medium 312 has a 3D shape in the form of a trapezoidal prism. In an embodiment, each of the dielectric medium 312 has a relative dielectric constant equal to or greater than 2 and equal to or less than 15.

Figure 4:
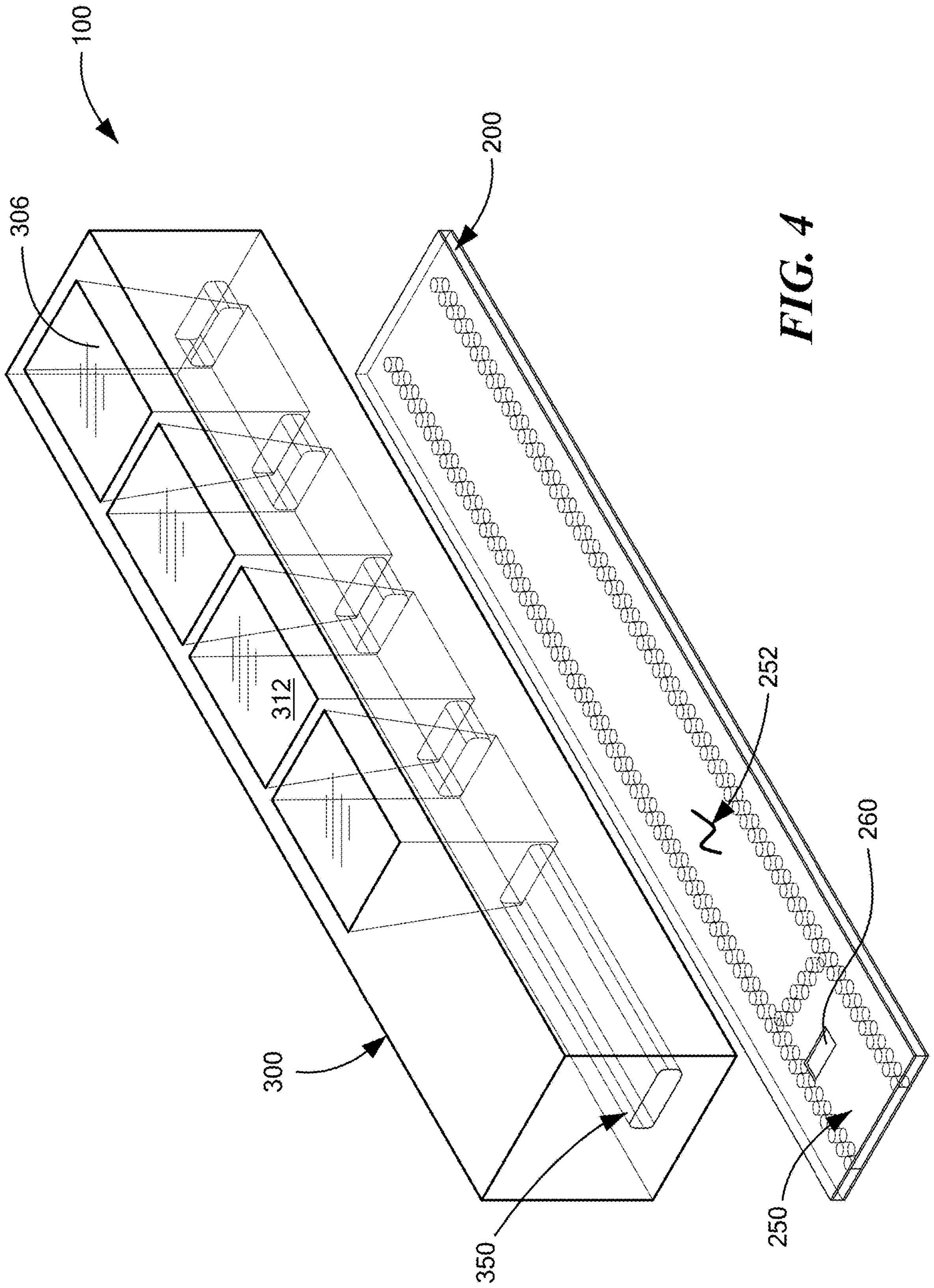
FIG. 4 depicts a rotated isometric transparent view of an expanded assembly view of other example upper and lower portions of the EM apparatus of FIG. 1A, in accordance with an embodiment.
Figure 5A:
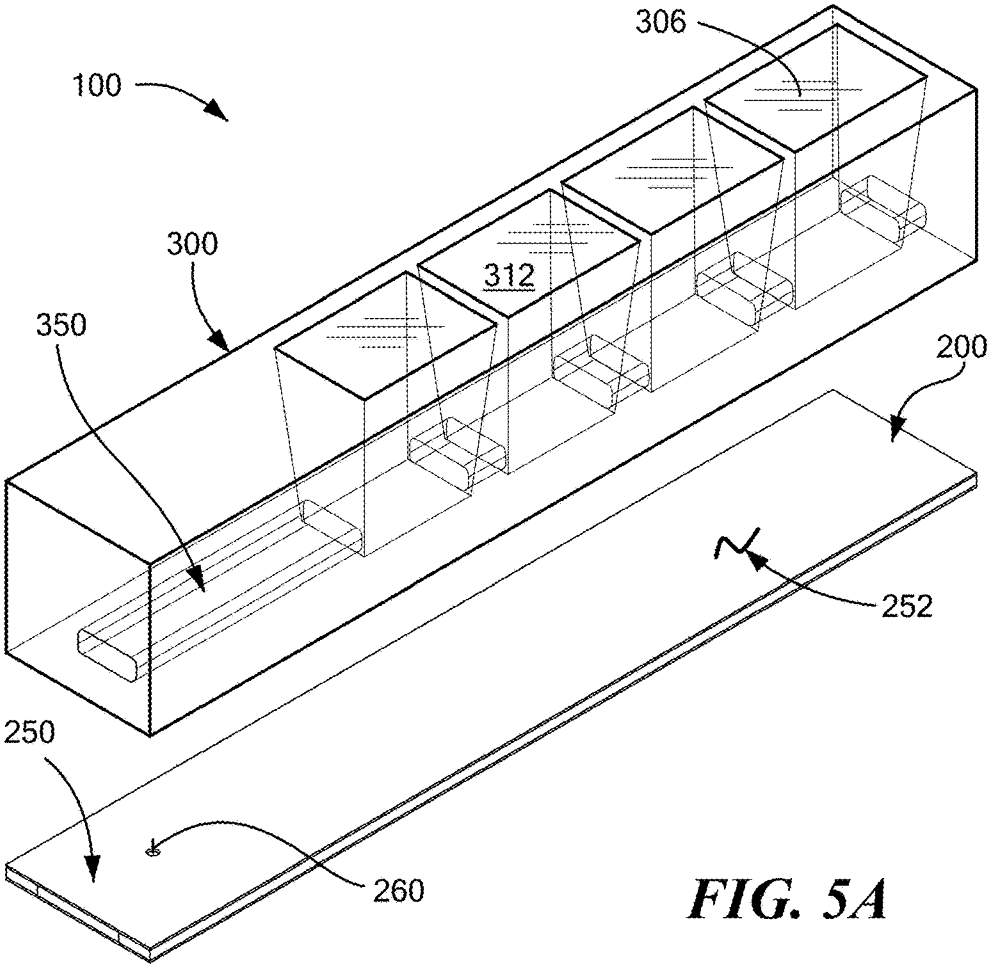
FIGS. 5A and 5B respectively depict; a rotated isometric transparent view of an EM apparatus similar to that of FIG. 4, but with an alternative feed structure, and a transparent end view of a completed assembly corresponding to the embodiment of FIG. 5A, in accordance with an embodiment.
Figure 5B:
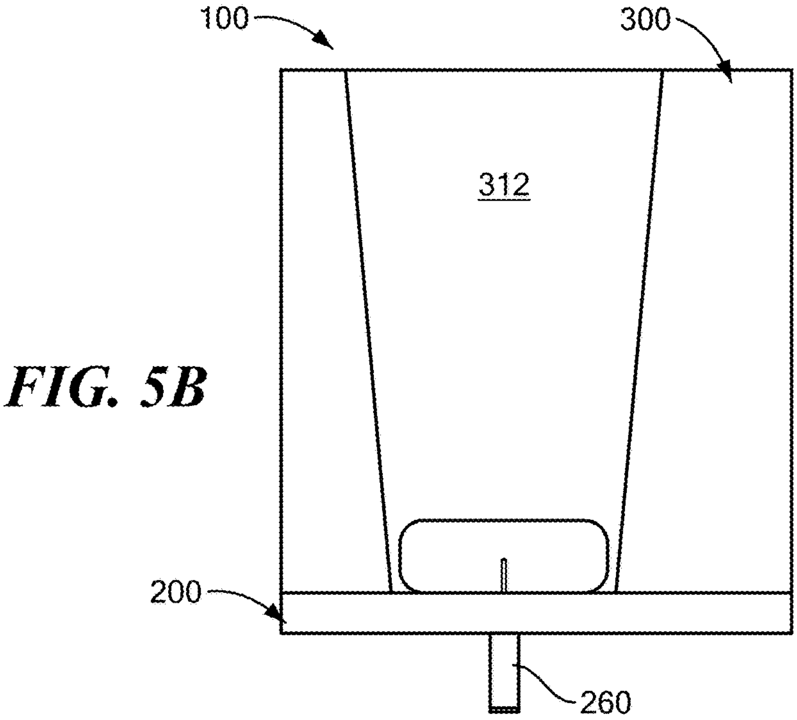

Reference is now made to FIGS. 3A-5B collectively, in combination with the foregoing figures, where: FIGS. 3A-3B depict the example upper second portion 300 of FIGS. 2A-2B in an expanded assembly view with an example lower first portion 200 of the EM apparatus 100 of FIG. 1A; FIG. 4 depicts a rotated isometric view of an expanded assembly view of other example first and second portions 200, 300 of the EM apparatus 100 of FIG. 1A; and, FIGS. 5A-5B depict views of an EM apparatus 100 similar to that of FIG. 4, but with an alternative feed structure, which will now be described.

In an embodiment, the first portion 100 includes an EM signal feed 250, and the second portion 300 is disposed on the first portion 200, where the second portion 300 has a shaped metallized form having at least one shaped metallized cavity or top-down recess 306, and the second portion 300 also includes a dielectric medium 312 disposed within each of the at least one shaped metallized cavity 306, such that respective ones of the dielectric medium 312 has a 3D shape that conforms to a shape of a corresponding one of the at least one shaped metallized cavity 306. In an embodiment, the EM signal feed 250 of the first portion 200 is an EM waveguide, wherein each of the at least one shaped metallized cavity 306 of the second portion 300 has a bottom opening 310 (best seen with reference to FIG. 1A), and wherein an upper surface 252 of the first portion 200 has an electrically conductive surface with at least one aperture 254 disposed in a one-to-one corresponding relationship with each bottom opening 310 of the second portion 300. In an embodiment, the EM signal feed 250 of the first portion 200 is a substrate integrated waveguide, SIW.

In an alternative embodiment and with reference particularly to FIG. 4, the second portion 300 includes an EM signal feed structure 350 disposed in signal communication with each of the at least one shaped metallized cavity 306, and the first portion 200 has an EM signal feed input 260 disposed in signal communication with the EM signal feed structure 350 of the second portion 300. In an embodiment, the EM signal feed structure 350 of the second portion 300 comprises air or a dielectric material other than air. In an embodiment, the EM signal feed input 260 of the first portion 200 is either a slotted aperture of a SIW (see FIG. 4, for example), or a coaxial cable (see FIGS. 5A-5B, for example).

Figure 6:
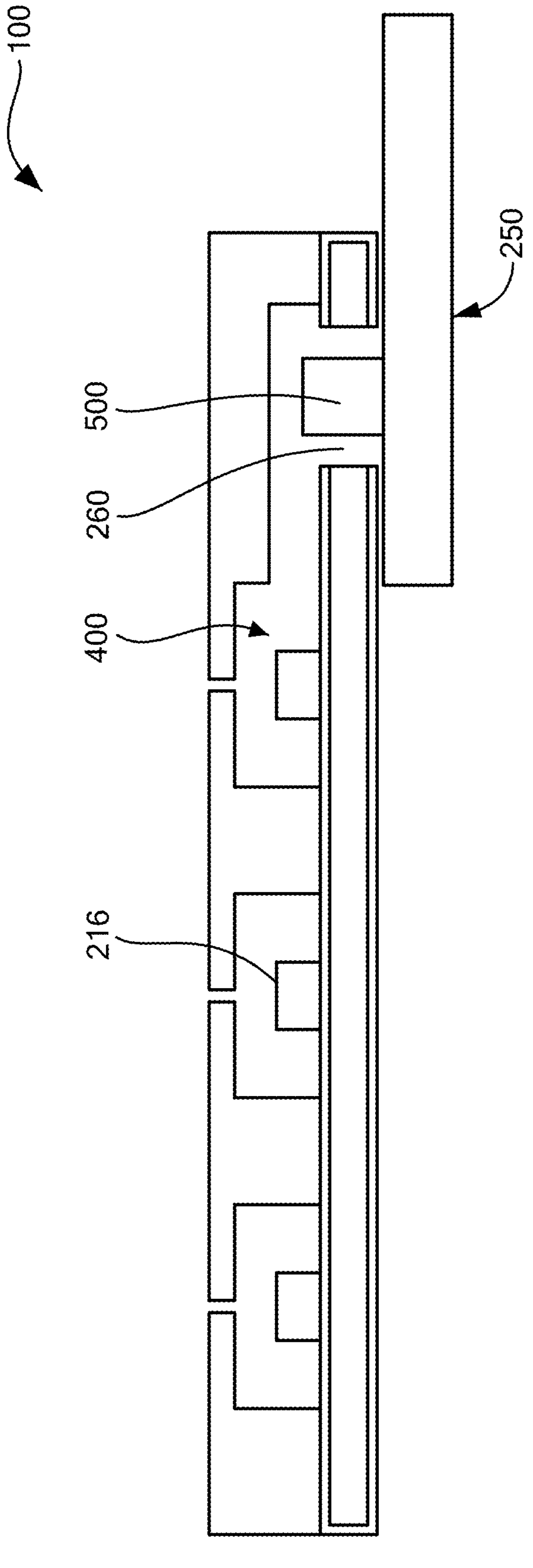
FIG. 6 depicts a front cross section view of an example lower portion of a partially assembled EM apparatus similar to that of FIG. 1A, but with a dielectric loaded signal feed port, in accordance with an embodiment.

Reference is now made to FIG. 6, in combination with the foregoing figures, which depicts a front cross section view of an example lower first portion 200 of an EM apparatus 100 similar to that of FIG. 1A, but with a dielectric loaded signal feed port 260, which will now be described.

In an embodiment, an EM apparatus 100 includes an EM signal feed 250, an air waveguide, AWG, 400 disposed in signal communication with the EM signal feed 250, and at least one dielectric loaded launch 500 disposed in signal communication with and between the EM signal feed 250 and the AWG 400. In an embodiment, the AWG 400 has a signal input port 260 disposed in signal communication with the EM signal feed 250, and the at least one dielectric loaded launch 500 is disposed at the signal input port 260. In an embodiment, each one of the at least one dielectric loaded launch 500 includes a dielectric medium having a relative dielectric constant equal to or greater than 2 and equal to or less than 15.

In an embodiment, the EM signal feed 250 includes a plurality of transmit channels 270 or receive channels 275 (best seen with reference to FIGS.7A-7B), and a respective one of the at least one dielectric loaded launch 500 is disposed in signal communication with and between the AWG 400 and a corresponding one of the plurality of transmit or receive channels 270, 275. In an embodiment, the EM signal feed 250 includes an RF chip, a SIW, a microstrip, a stripline, a slotted aperture, or a patch.

Figure 7A:
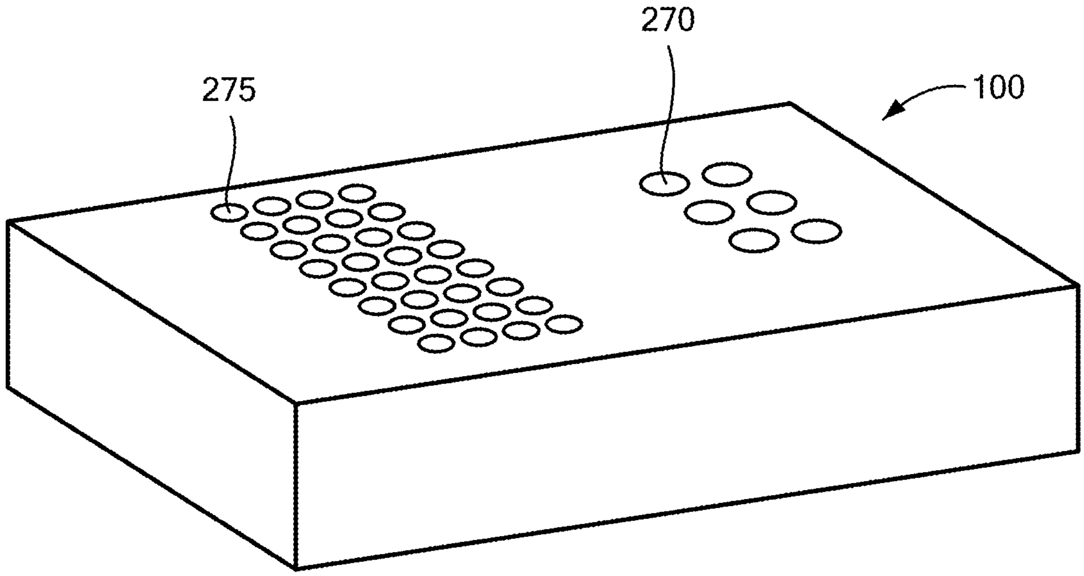
FIGS. 7A and 7B respectively depict a rotated isometric view and a front cross section view of waveguide layers of an example EM apparatus, in accordance with an embodiment.
Figure 7B:
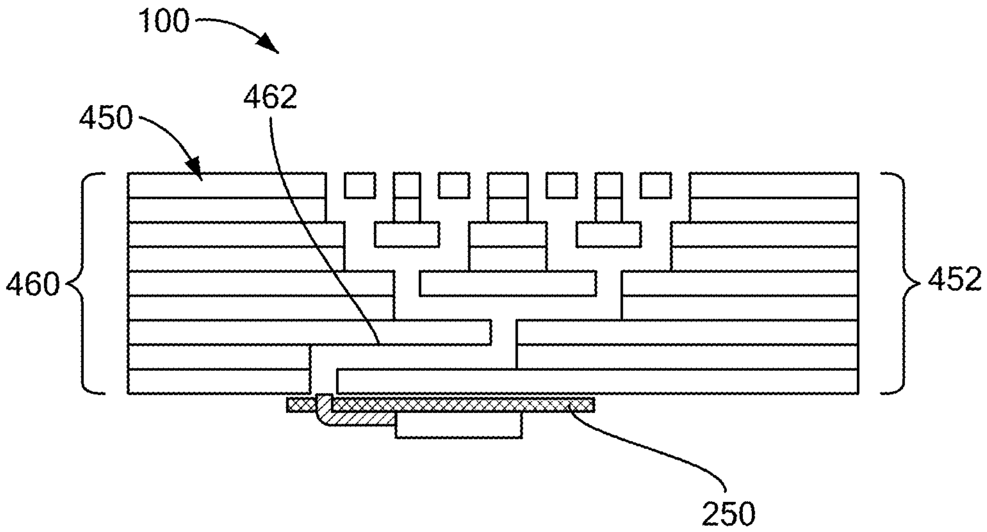

Reference is now made to FIGS. 7A-7B, in combination with the foregoing figures, which depicts a rotated isometric view and a front cross section view of waveguide layers 452 of an example EM apparatus 100. In an embodiment, the EM apparatus 100 includes an EM signal feed 250, an AWG 450 comprising a plurality of antenna ports 270, 275, and an EM divider network 460 disposed in signal communication with and between the plurality of antenna ports 270, 275 and the EM signal feed 250, the EM divider network 460 providing a power dividing signal path between corresponding ones of the plurality of antenna ports 270, 275 and the EM signal feed 250, and a plurality of dielectric loaded medium 500 disposed at, and in one to one correspondence with, the plurality of antenna ports 270, 275 (best seen with reference to FIG. 6 in combination with FIGS. 7A-7B).

Figure 8B:
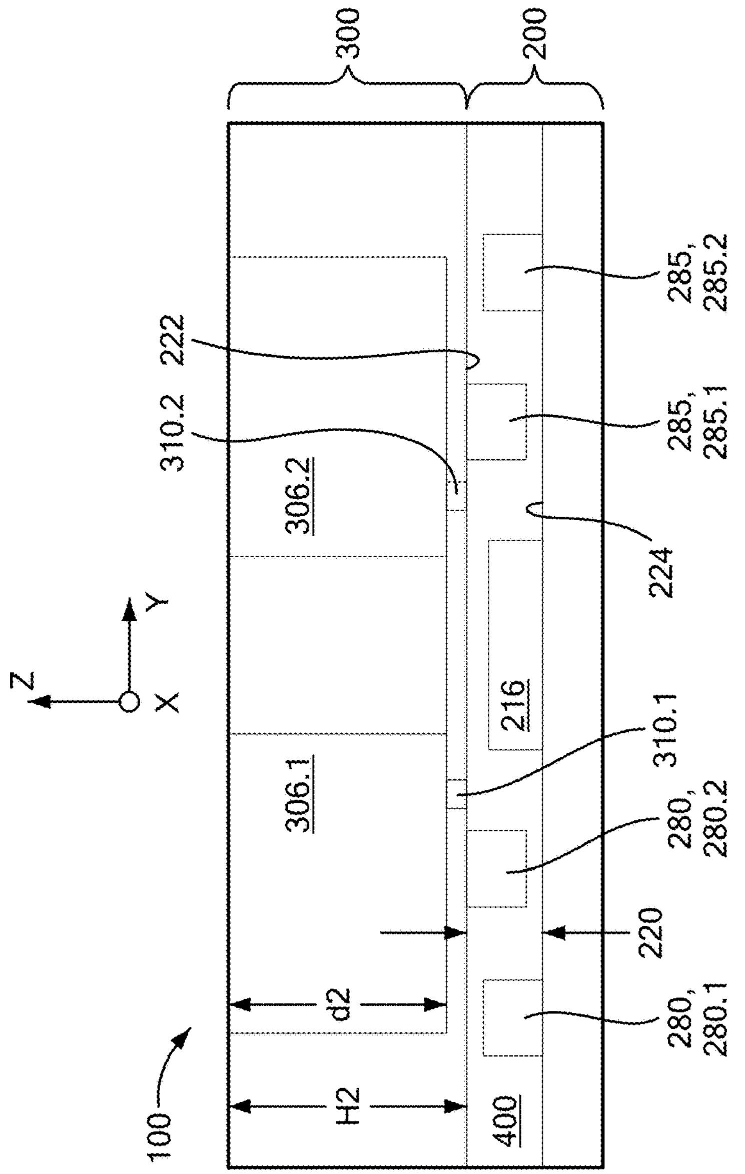
FIGS. 8A and 8B respectively depict a plan view and a front cross section view of example lower and upper portions of an example EM apparatus similar to that of FIG. 1A, in accordance with an embodiment.
Figure 8A:
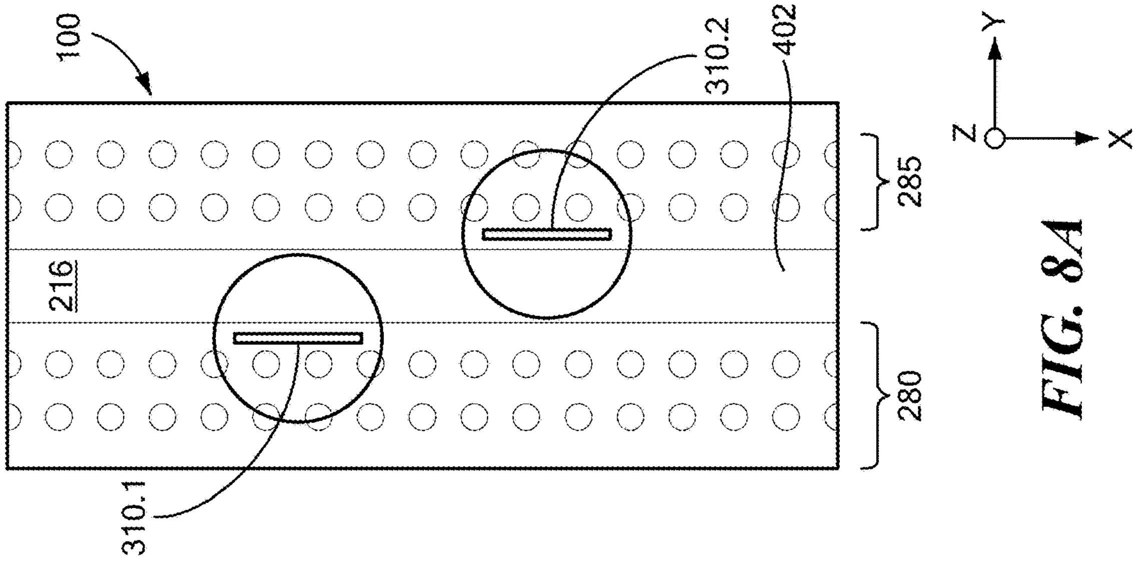
Figure 9B:
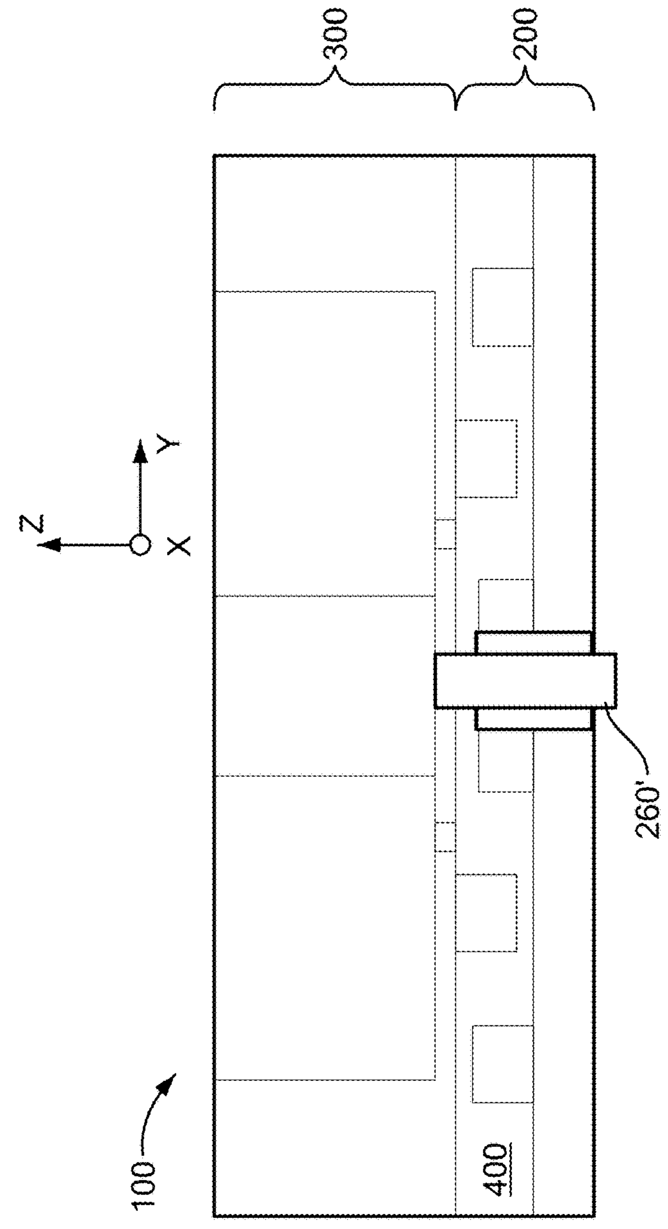
FIGS. 9A and 9B respectively depict views of an EM apparatus similar to those of FIGS. 8A and 8B, but with a coaxial signal feed, in accordance with an embodiment.
Figure 9A:
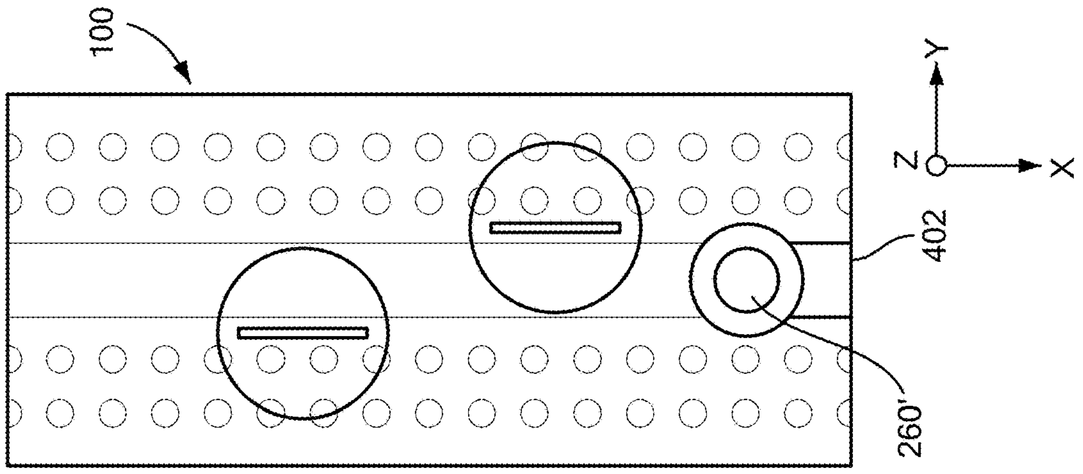
Figure 10A:
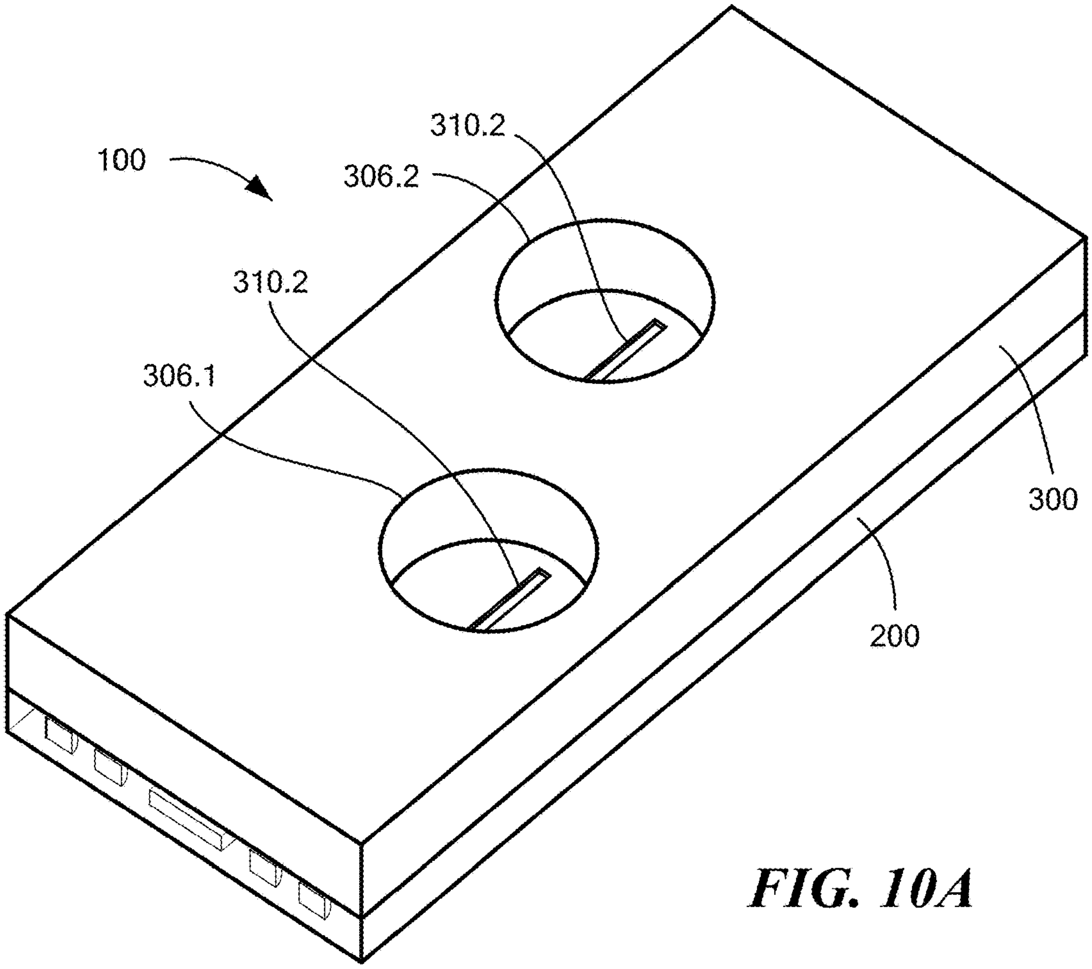
FIGS. 10A and 10B respectively depict a rotated isometric view and a transparent rotated isometric view of example lower and upper portions of an EM apparatus similar to that of FIG. 1A with the upper portion depicted in solid view in FIG. 10A and transparent view in FIG. 10B, in accordance with and embodiment.
Figure 10B:
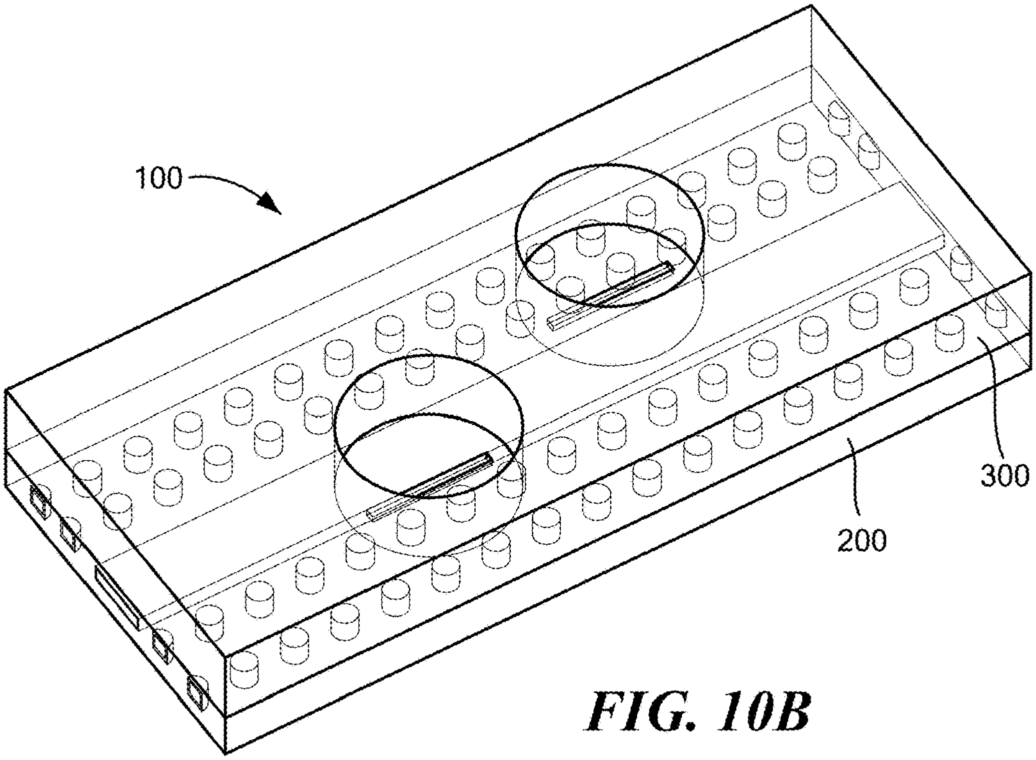
Figure 11B:
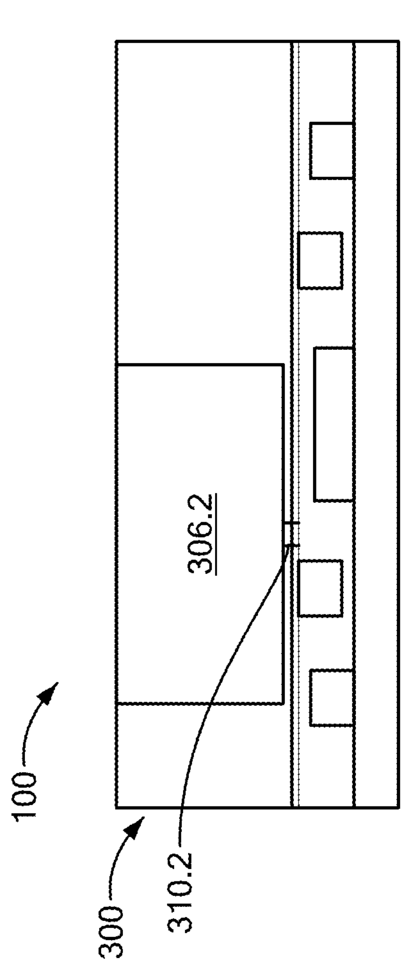
FIGS. 11A, 11B, and 11C, respectively depict a plan view, a first front cross section view, and a second front cross section view, of the EM apparatus of FIG. 10A, in accordance with an embodiment.
Figure 11C:
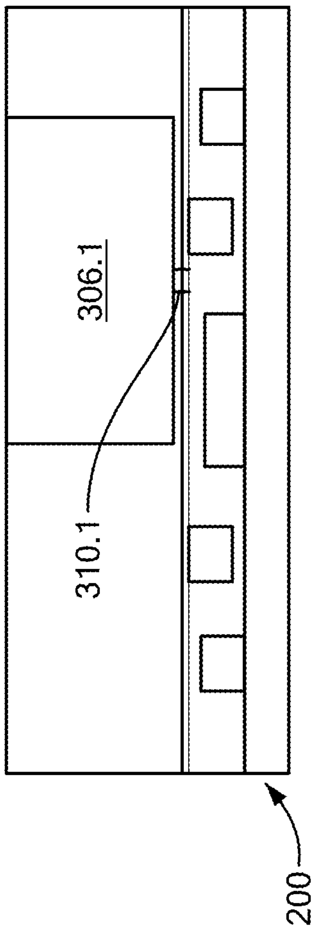
Figure 11A:
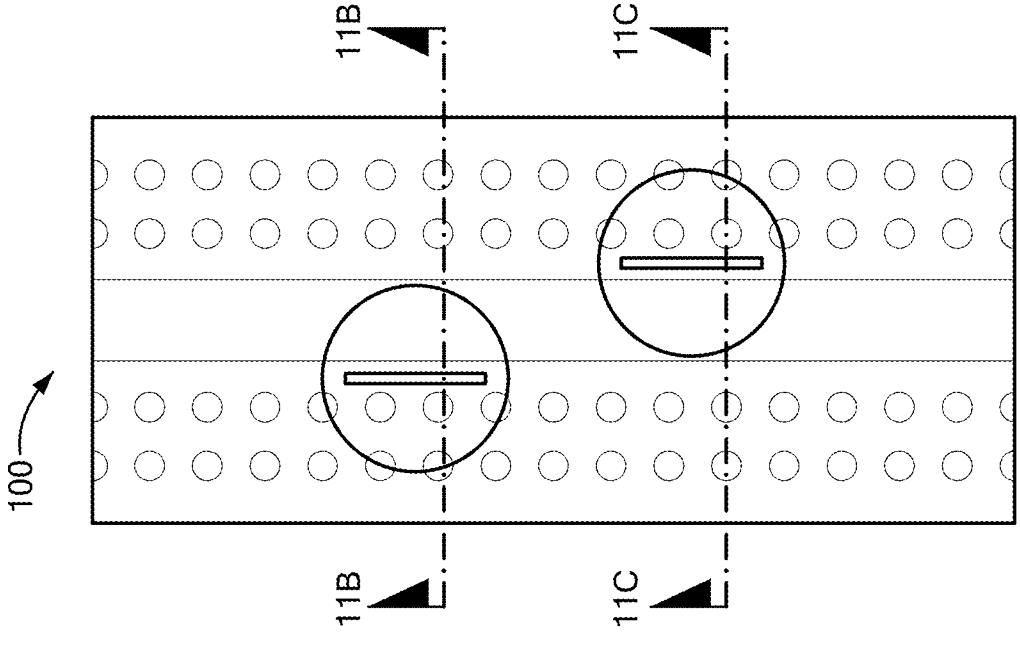

Reference is now made to FIGS. 8A-11C collectively, in combination with the foregoing figures, where: FIGS. 8A-8B depict a plan view and a front cross section view of example lower and upper portions of an example EM apparatus similar to that of FIG. 1A; FIGS. 9A-9B depict views of an EM apparatus 100 similar to those of FIGS. 8A-8B, but with a coaxial signal feed; FIGS. 10A-10B depict rotated isometric views of example lower and upper portions of an EM apparatus 100 similar to that of FIG. 1A with the upper portion depicted in solid and transparent view; and, FIGS. 11A-11C depict a plan view and front cross section views of the EM apparatus 100 of FIGS. 10A-10B.

In an embodiment, an EM apparatus 100 includes a first portion 200 and a second portion 300 disposed on the first portion 200, the first portion 200 having an AWG 400 having electrically conductive internal surfaces, and a ridge projection 216 that extends lengthwise within the AWG 400 (i.e., into the view plane of FIG. 8B), the ridge projection 216 having electrically conductive surfaces within the AWG 400. The first portion 200 also having: a first plurality of wall projections 280 that extend at least partially across a gap 220 between a top surface 222 and a bottom surface 224 of the AWG 400, the first plurality of wall projections 280 being disposed on one side of the ridge projection 216 and distributed in a direction parallel to the ridge projection 216 (i.e., into the view plane of FIG. 8A as depicted in the plan view), the first plurality of wall projections 280 having electrically conductive surfaces within the AWG 400; and, a second plurality of wall projections 285 that extend at least partially across the gap 220 between the top surface 222 and the bottom surface 224 of the AWG 400, the second plurality of wall projections 285 being disposed on an opposing side of the ridge projection 216 and distributed in a direction parallel to the ridge projection 216 (i.e., into the view plane of FIG. 8A as depicted in the plan view), the second plurality of wall projections 285 having electrically conductive surfaces within the AWG 400.

In an embodiment, the upper/top surface 222 of the AWG 400 has a first aperture 310.1 disposed between the ridge projection 216 and the first plurality of wall projections 280 on one side of the ridge projection 216, and a second aperture 310.2 disposed between the ridge projection 216 and the first plurality of wall projections 280 on a second opposing side of the ridge projection 216. In an embodiment, the second aperture 310.2 is longitudinally displaced relative to the first aperture 310.1 along a length of the AWG 400 (as observed in the plan view of FIG. 8A) such that the first and second apertures 310.1, 310.2 are not directly across from each other on opposing sides of the ridge projection 216.

In an embodiment, the first plurality of wall projections 280 comprise a first row of wall projections 280.1 that extend only partially from the bottom surface 224 of the AWG 400 toward the top surface 222 of the AWG 400, and a second row of wall projections 280.2 that extend only partially from the top surface 222 of the AWG 400 toward the bottom surface 224 of the AWG 400, and the second plurality of wall projections 285 comprise a third row of wall projections 285.1 that extend only partially from the top surface 222 of the AWG 400 toward the bottom surface 222 of the AWG 400, and a fourth row of wall projections 285.2 that extend only partially from the bottom surface 224 of the AWG 400 toward the top surface 222 of the AWG 400.

In an embodiment, the first row of wall projections 280.1 are outboard of the second row of wall projections 280.2 relative to the ridge projection 216, and the fourth row of wall projections 285.2 are outboard of the third row of wall projections 285.1 relative to the ridge projection 216.

In an embodiment, the ridge projection 216 is a metal coated dielectric material.

In an embodiment and with particular reference to FIGS. 10A-10B, the second portion 300 is disposed on top of the first portion 200, where the second portion 300 includes a first top-down recess 306.1 that is axially centrally aligned with the first aperture 310.1, and a second top-down recess 306.2 that is axially centrally aligned with the second aperture 310.2, and where the second portion 300, including the first and second top-down recesses 306.1, 306.2, has electrically conductive surfaces. In an embodiment, the first and second top-down recesses 306.1, 306.2 with the electrically conductive surfaces form EM reflectors.

In an embodiment, the second portion 300 has an overall height H2 (see FIG. 1A for example), each one of the first top-down recess 306.1 and the second top-down recess 306.2 has a corresponding floor at a depth d2 where $d2<H2$, and each corresponding floor has an aperture 310.1, 310.2 that mimics a corresponding one of a first aperture 254 and a second aperture 254 of the first portion 200 (see for example, the plurality of apertures 254 in FIG. 3A).

In an embodiment, a dielectric resonator antenna, DRA, 312 (see FIG. 1A for example) is disposed in each one of the first top-down recess 306.1 and the second top-down recess 306.2 of the second portion 300 in such a manner as to cover respective ones of the first and second apertures 310.1, 310.2.

In an embodiment and with reference to FIGS. 8A-9B, the AWG 400 includes a signal input port 402, and the first portion 200 further includes a signal feed 260' disposed to electromagnetically excite the signal input port 402 of the AWG 400. In an embodiment, the signal feed 260' is in the form of a coaxial cable.

Figure 12A:
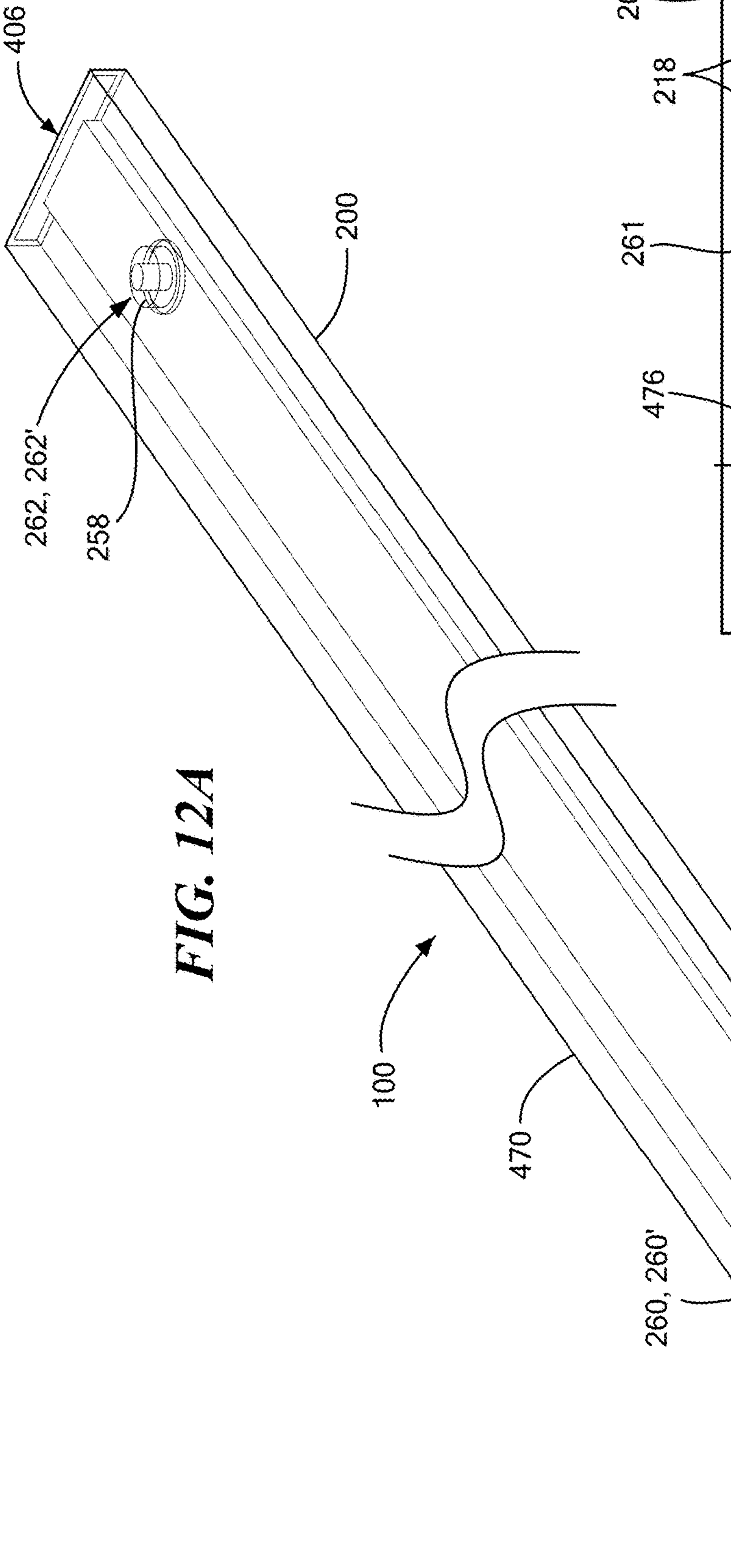
FIGS. 12A and 12B respectively depict a rotated isometric view and a front cross section view of an example lower portion of an EM apparatus, in accordance with an embodiment.
Figure 12B:
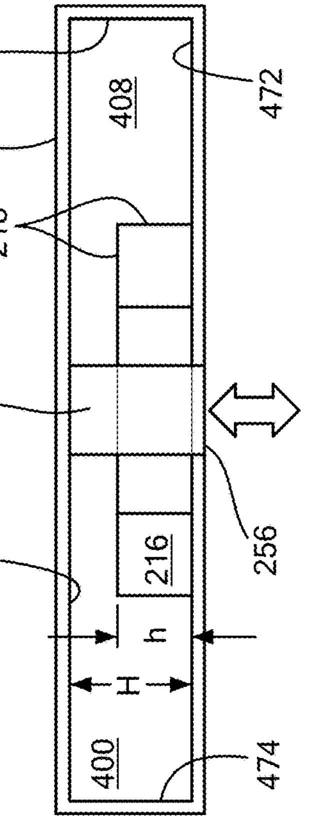

Reference is now made to FIGS. 12A-12B, in combination with the foregoing figures, which depicts a rotated isometric view and a front cross section view of an example lower portion 200 of an EM apparatus 100. In an embodiment, the EM apparatus 100 includes an AWG 400 having, as viewed in the axial cross section of the AWG 400, an elongated housing 470 having a contiguous arrangement of a floor 472, a first wall 474, a ceiling 476, and a second wall 478, wherein the floor 472, the first wall 474, the ceiling 476, and the second wall 478, each have an electrically conductive material, the housing 470 having a distance H between the floor 472 and the ceiling 476. Also as viewed in the axial cross section of the AWG 400, the EM apparatus 100 further includes a centrally disposed elongated ridge projection 216 that extends from the floor 472, wherein outer surfaces 218 of the ridge have an electrically conductive material, the ridge projection 216 having a height h where $h<H$, a first signal port 260 disposed at a first end 404 of the AWG 400, a second signal port 262 disposed at a second end 406 of the AWG 400, the second end 406 disposed at a distance from the first end 404, a first aperture 256 at the first signal port 260 that extends contiguously through the floor 472 and the ridge projection 216, and a second aperture 258 at the second signal port 262 that extends contiguously through the floor 472 and the ridge projection 216.

In an embodiment, the EM apparatus 100 further includes a first EM signal feed 260' disposed in signal communication with the first signal port 260. In an embodiment, the first EM signal feed 260' is a coaxial signal feed that extends through the first aperture 256, wherein a signal line 261 of the coaxial signal feed extends into the AWG 400 between a top of the ridge projection 216 and the ceiling 476 of the AWG 400.

In an embodiment, the EM apparatus 100 further includes a second EM signal feed 262' disposed in signal communication with the second signal port 262.

In an embodiment, the first EM signal feed 260' is a transmit signal feed, and the second EM signal feed 262' is a receive signal feed configured to receive an EM signal from the first EM signal feed 260' via the AWG 400.

In an embodiment, an interior volume 408 of the AWG 400, as defined by the floor 472, the first wall 474, the ceiling 476, and the second wall 478 of the AWG 400, and by the outer surfaces of the ridge projection 216, includes air. As used herein, the phrase "includes air" necessarily includes air but does not preclude the presence of another non-air material such as an air-filled foam for example.

Figure 13A:
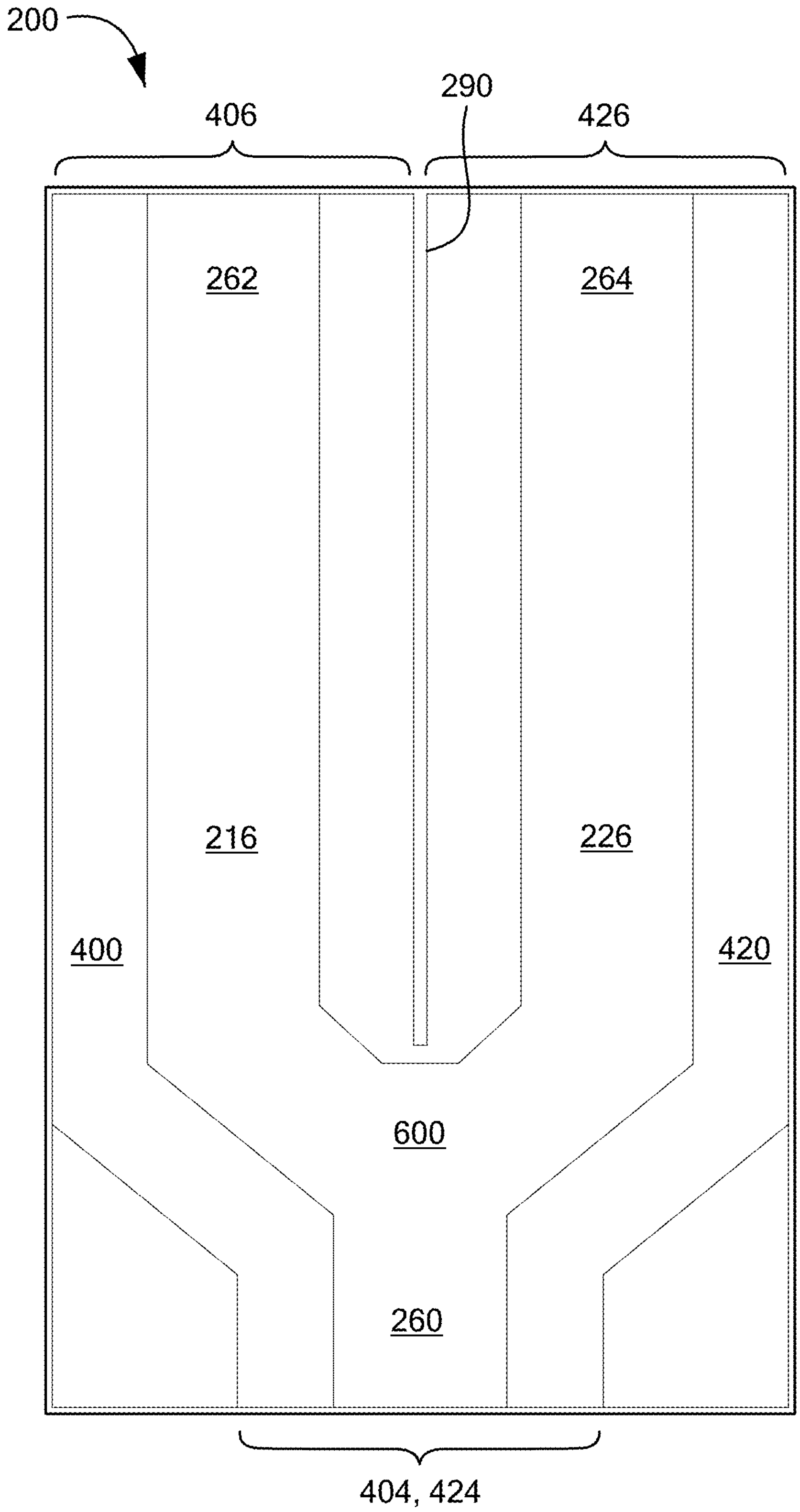
FIGS. 13A, 13B, and 13C, respectively depict a plan view, a first rotated isometric view, and a second rotated isometric view with EM performance characteristics depicted, of an example lower portion of an EM apparatus having power divider junction, in accordance with an embodiment.
Figure 13B:
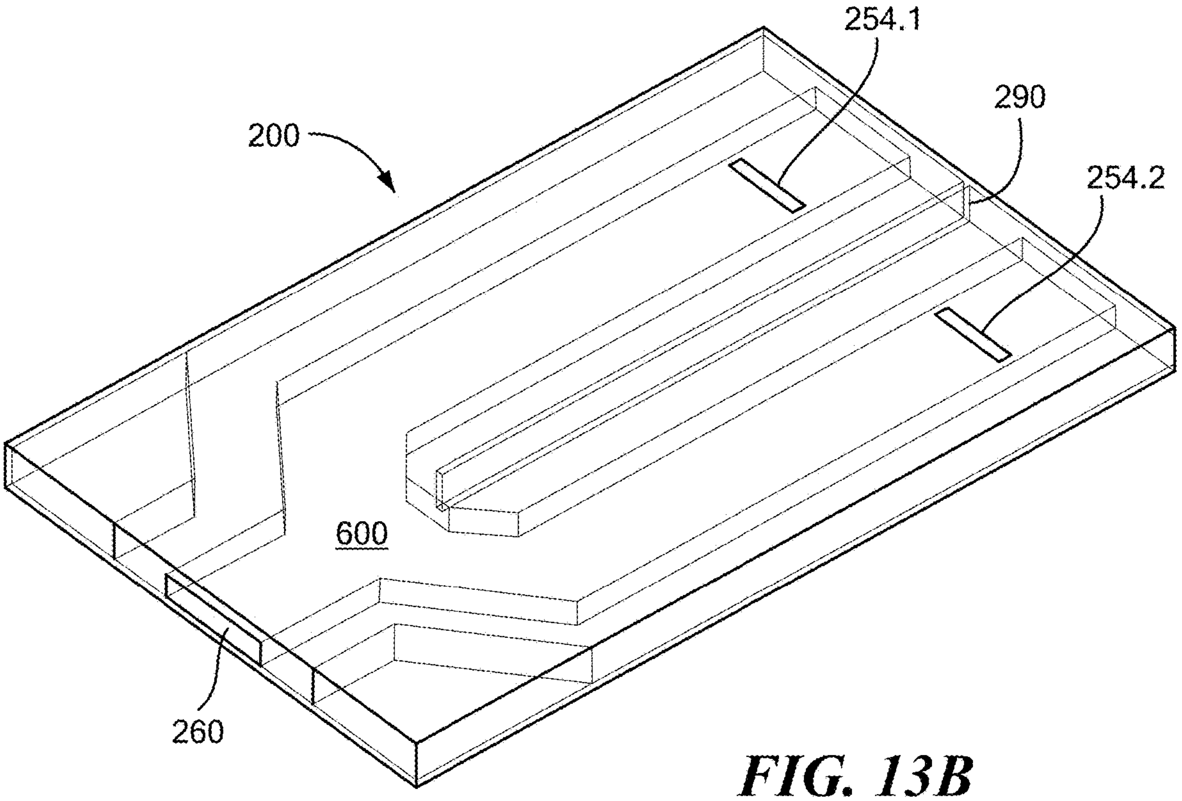
Figure 13C:
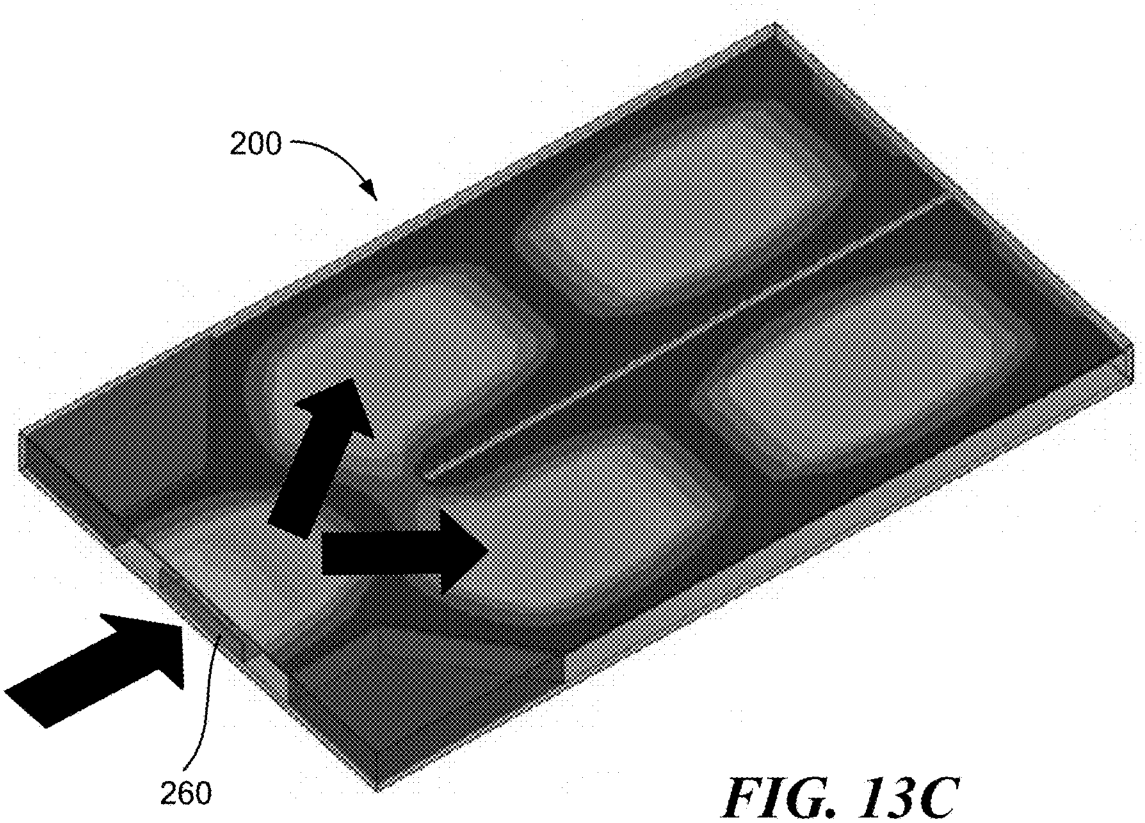

Reference is now made to FIGS. 13A-13C, in combination with the foregoing figures, which depicts a plan view and rotated isometric views of an example lower portion 200 of an EM apparatus 100 having a power divider junction 600.

In an embodiment, the AWG 400 is a first AWG 400 and the ridge projection 216 is a first ridge projection 216, and further wherein the lower portion 200 of the EM apparatus 100 has another of the AWG and another of the ridge projection to define a second AWG 420 having a second ridge projection 226. In an embodiment, the second AWG 420 and the second ridge projection 226 are disposed, respectively, parallel to the first AWG 400 and the first ridge projection 216. In an embodiment, the first end 404 of the first AWG 400 is conjoined with a first end 424 of the second AWG 420 via a power divider junction 600, such that the first signal port 260 is a common signal port to both the first AWG 400 and the second AWG 420. In an embodiment, the second signal port 262 is disposed at the second end 406 of the first AWG 400, wherein the lower portion 200 further includes a third signal port 264 disposed at a second end of the second AWG 420, the second end 426 of the second AWG 420 disposed at a distance from the first end 424 of the second AWG 420. In an embodiment, the first AWG 400 and the second AWG 420 are separated by an electrically conductive wall 290 disposed therebetween, the electrically conductive wall 290 extending between and electrically connected to the floor 472 and the ceiling of the first AWG 400 and the second AWG 420. In an embodiment, the power divider junction 600 is a 3 dB power divider junction. In an embodiment, the first signal port 260 is in signal communication with both the second signal port 262 and the third signal port 264 via the power divider junction 600.

Figure 14B:
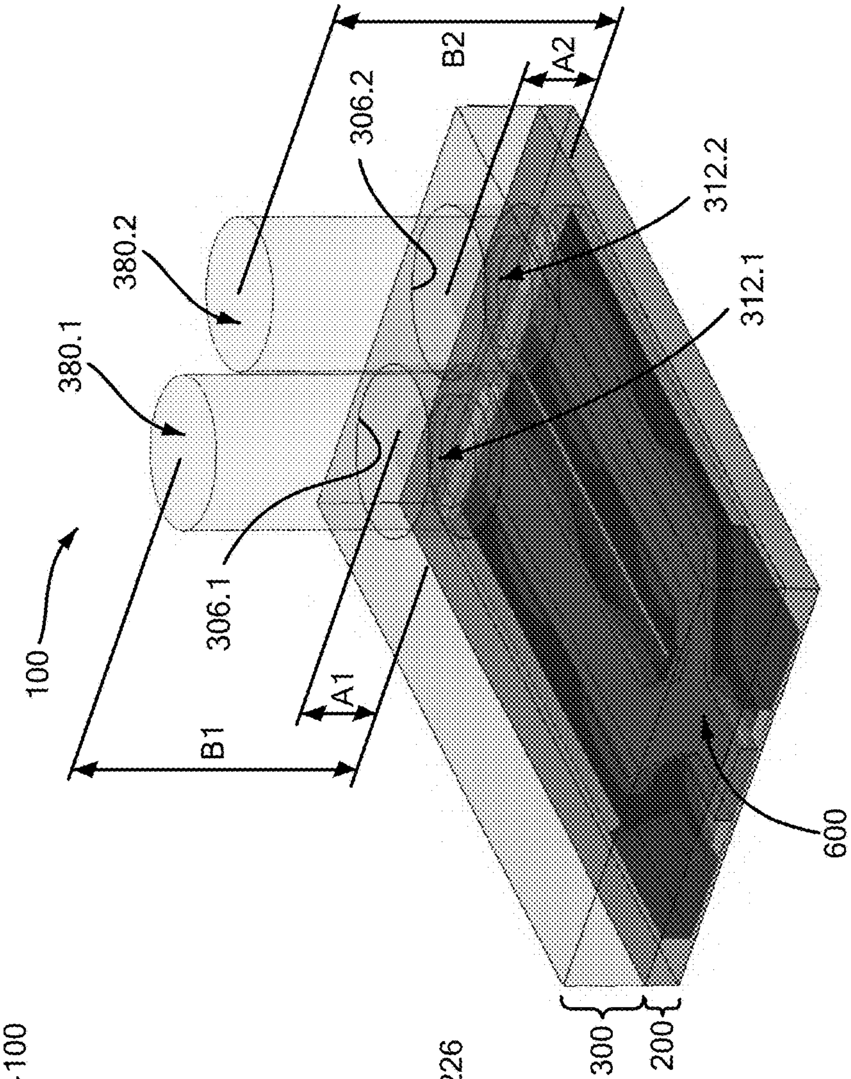
FIGS. 14A and 14B respectively depict a plan view and a transparent rotated isometric view of an EM apparatus similar to those of FIGS. 13A and 13B, but with DRAs and lenses, in accordance with an embodiment.
Figure 14A:
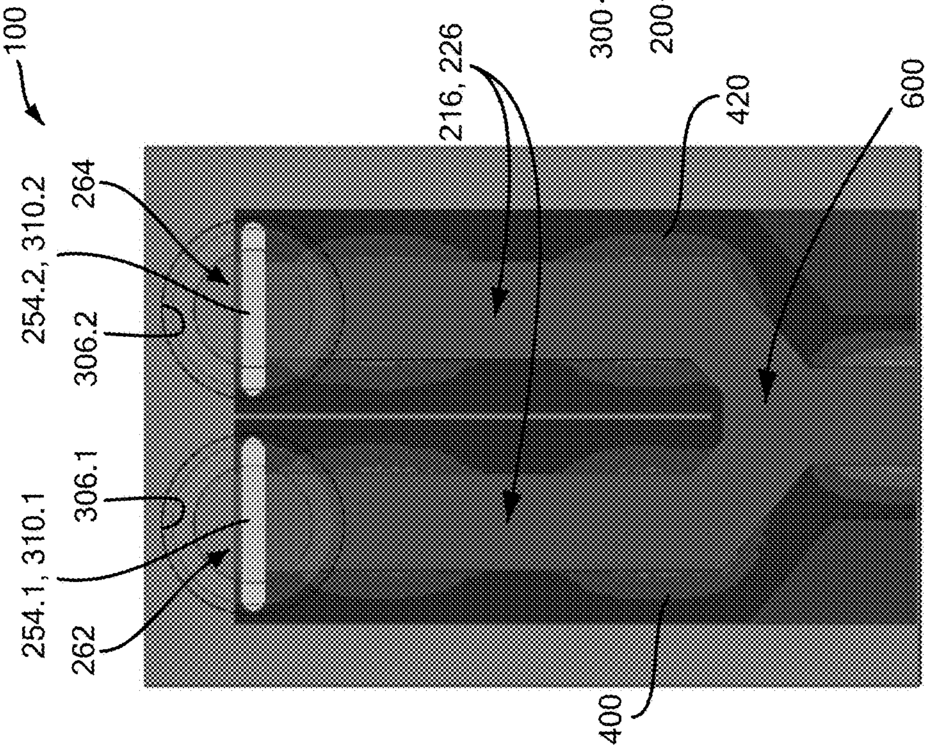
Figure 15:
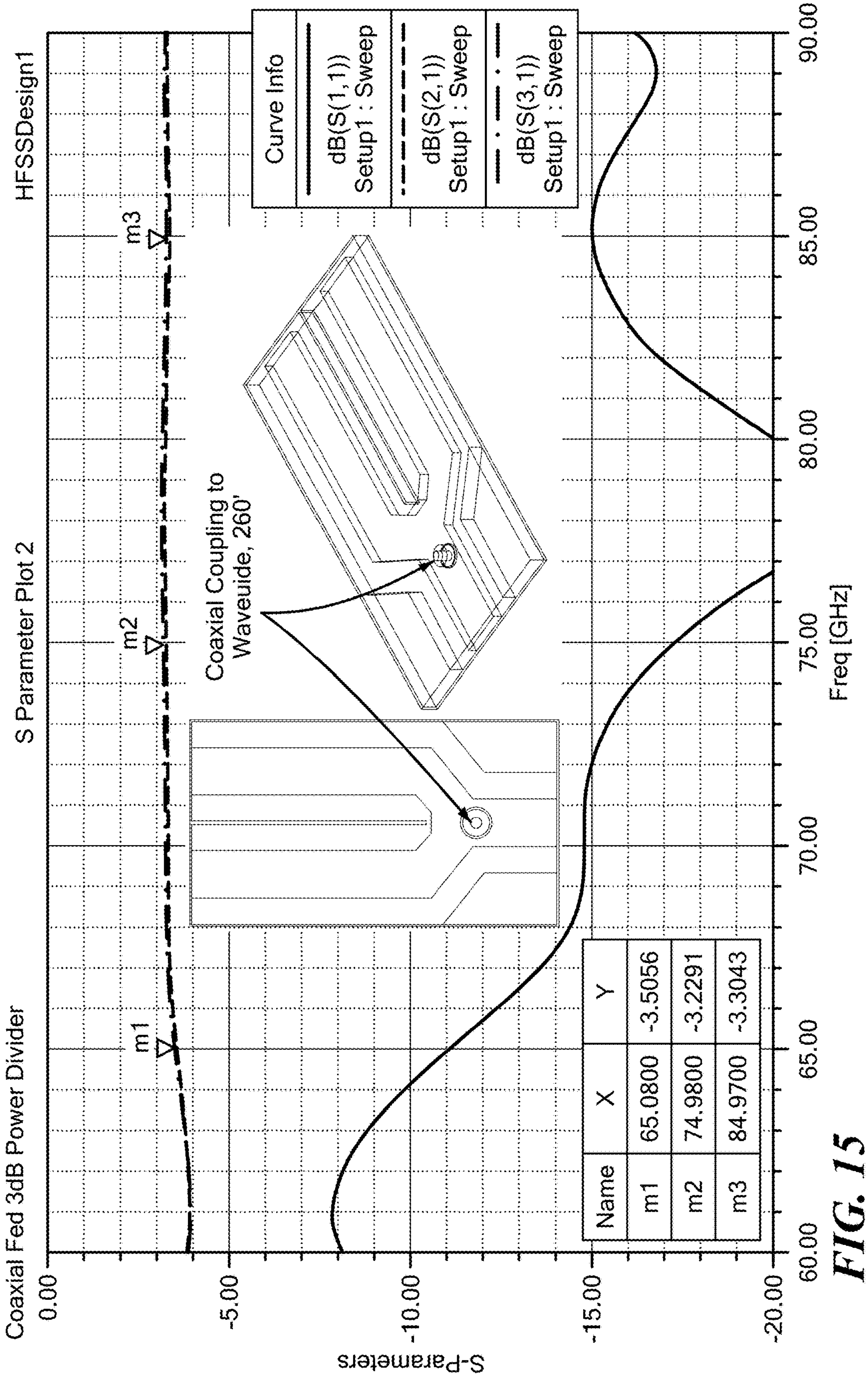
FIG. 15 depicts performance characteristics of the EM apparatus of FIGS. 14A and 14B with a coaxial feed at the junction, in accordance with an embodiment.
Figure 16:
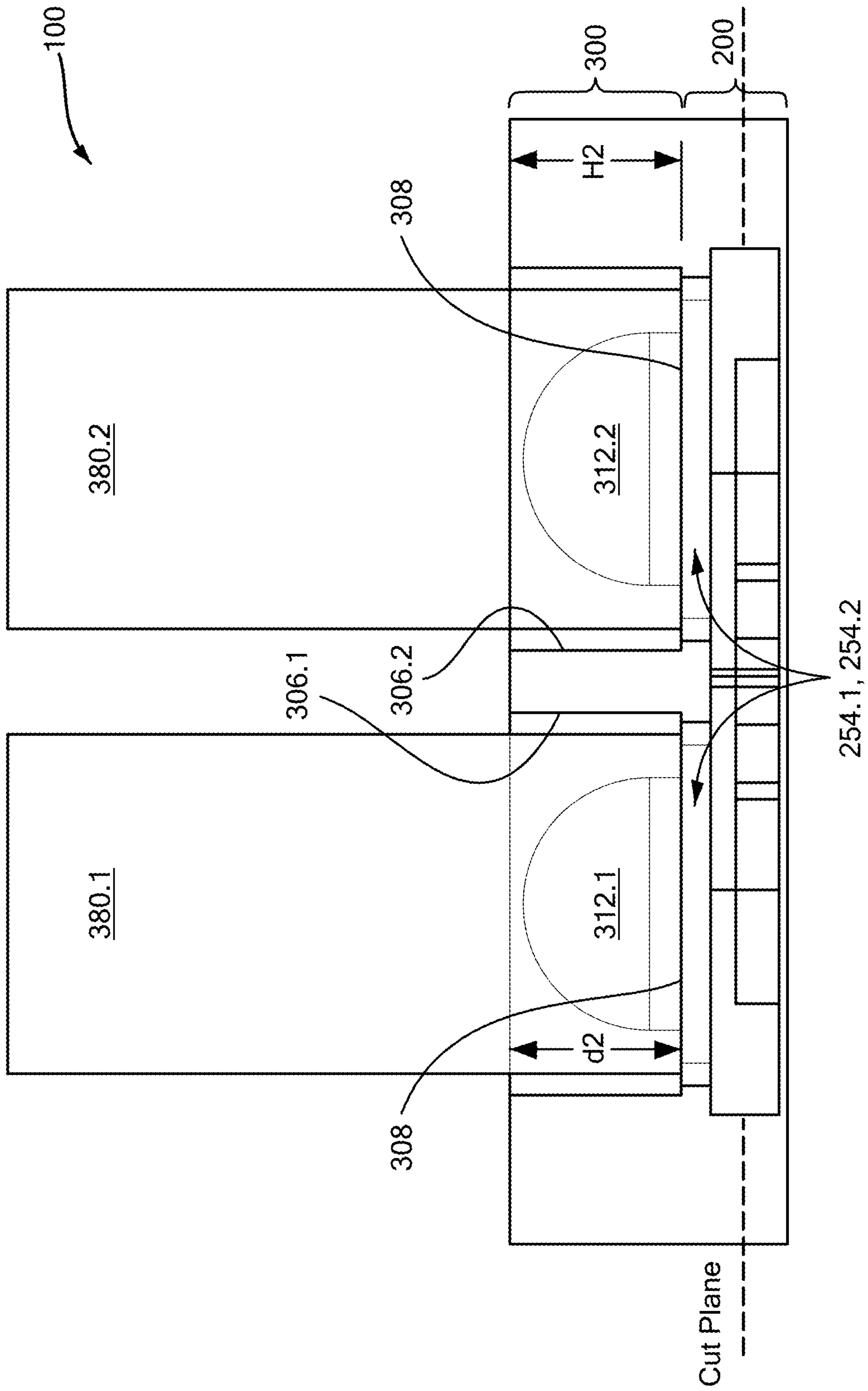
FIG. 16 depicts a front cross section view of the EM apparatus of FIGS. 14A and 14B with the cut plane through the coupling slots, in accordance with an embodiment.

Reference is now made to FIGS. 14A-16, where; FIGS. 14A-14B depict a plan view and a transparent rotated isometric view of an EM apparatus 100 similar to those of FIGS. 13A-13C, but with a corresponding DRA 312 and lens 380 disposed in signal communication with corresponding ones of the second and third signal ports 262, 264; FIG. 15 depicts coaxial fed 3 dB power divider performance characteristics of the EM apparatus 100 of FIG. 14; and FIG. 16 depicts a front cross section view of the EM apparatus 100 of FIGS. 14A-14B with the cut plane through coupling slots 254.1, 254.2. In an embodiment, the second signal port 262 has a first elongated slotted aperture (coupling slot) 254.1 having a lengthwise direction of elongation across a width of the first AWG 400, and the third signal port 264 has a second elongated slotted aperture (coupling slot) 254.2 having a lengthwise direction of elongation across a width of the second AWG 420. In an embodiment, the EM apparatus 100 has a first DRA 312.1 disposed at the second signal port 262 over the first elongated slotted aperture 254.1, and a second DRA 312.2 disposed at the third signal port 264 over the second elongated slotted aperture 254.2. In an embodiment, the EM apparatus 100 further has a first dielectric beam shaper (alternatively herein referred to as a lens) 380.1 disposed on top of the first DRA 312.1, and a second dielectric beam shaper (lens) 380.2 disposed on top of the second DRA 312.2. In an embodiment, the first dielectric beam shaper 380.1 substantially or completely envelopes the first DRA 312.1, and the second dielectric beam shaper 380.2 substantially or completely envelopes the second DRA 312.2. In an embodiment, the first DRA 312.1 has an overall height A1, the first dielectric beam shaper 380.1 has an overall height B1, and B1>A1, and the second DRA 312.2 has an overall height A2, the second dielectric beam shaper 380.2 has an overall height B2, and B2>A2. In an embodiment, B1 is equal to or greater than 2 times A1, and B2 is equal to or greater than 2 times A2. In an embodiment, the second DRA 312.2 has a same shape, size, and composition, as the first DRA 312.1, and the second dielectric beam shaper 380.2 has a same shape, size, and composition, as the first dielectric beam shaper 380.1.

In an embodiment, and with reference still to FIGS. 14A-14B, the first AWG 400 and the second AWG 420 in combination provide a first portion 200 of the EM apparatus 100, and further wherein the EM apparatus 100 includes a second portion 300 disposed on top of the first portion 200, the second portion 300 having a first top-down recess 306.1 that is axially centrally aligned with the first elongated slotted aperture 254.1 of the first portion 200, and a second top-down recess 306.2 that is axially centrally aligned with the second elongated slotted aperture 254.2 of the first portion 200, wherein the second portion 300, including the first and second top-down recesses 306.1, 306.2, has electrically conductive surfaces. In an embodiment, the first and second top-down recesses 306.1, 306.2 with electrically conductive surfaces form EM reflectors. In an embodiment, and best seen with reference to FIG. 16, the second portion 300 has an overall height H2, each one of the first top-down recess 306.1 and the second top-down recess 306.2 has a corresponding floor 308 at a depth d2, where d2<H2, and each corresponding floor 308 has an aperture 310.1, 310.2 that mimics a corresponding one of the first elongated slotted aperture 254.1 and the second elongated slotted aperture 254.2 of the first portion 200. In an embodiment, the first DRA 312.1 is disposed within the first top-down recess 306.1, and the second DRA 312.2 is disposed within the second top-down recess 306.2. In an embodiment, the first dielectric beam shaper 380.1 is disposed within the first top-down recess 306.1, and the second dielectric beam shaper 380.2 is disposed within the second top-down recess 306.2.

In an embodiment, and as depicted in FIG. 15 with reference also to FIGS. 14A-14B, a coaxial signal feed 260' is disposed at the power divider junction 600. FIG. 15 depicts performance characteristics of the EM apparatus 100 of FIGS. 14A-14B with the coaxial feed 260' at the divider junction 600.

Figure 17:
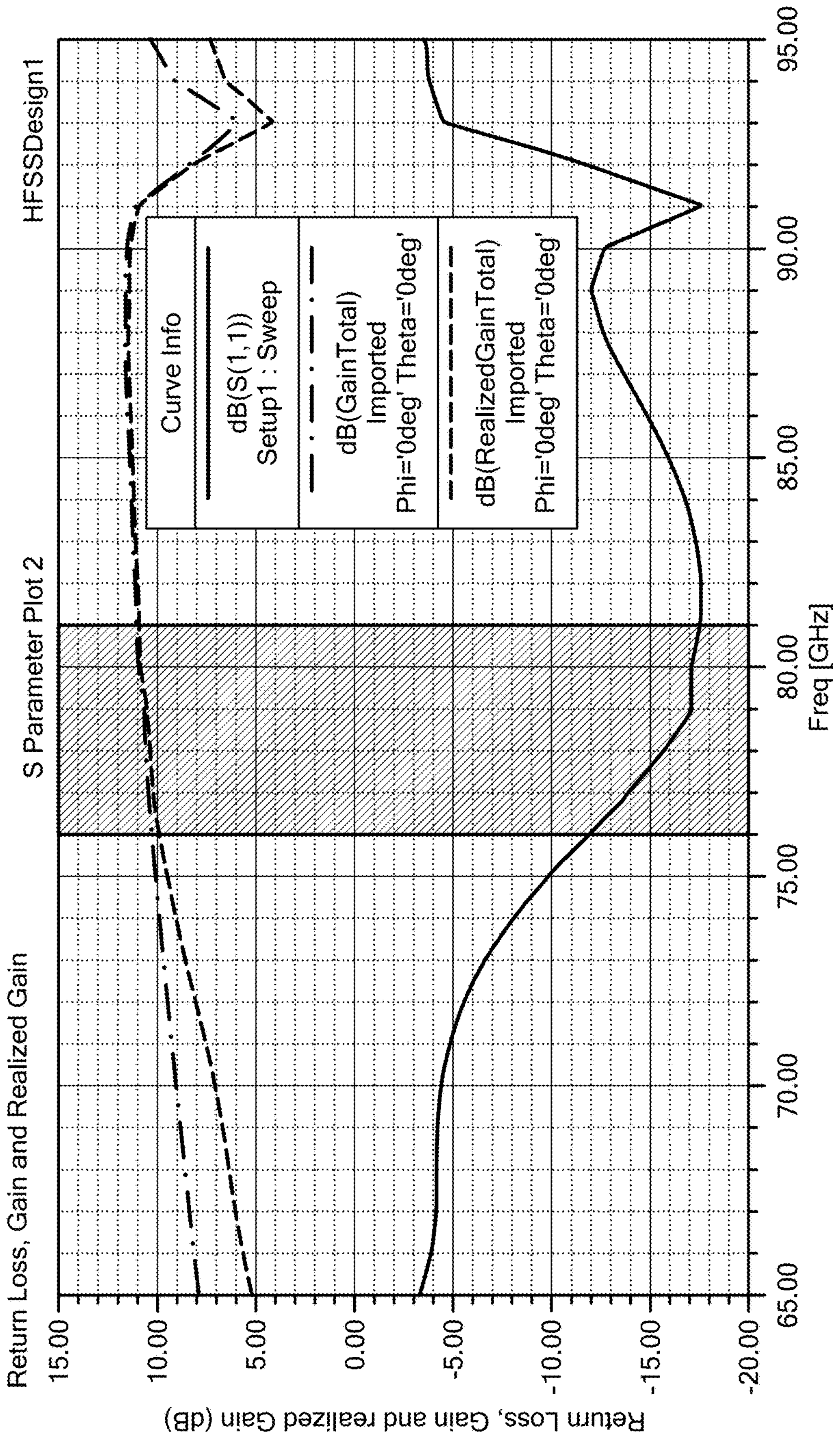
FIG. 17 depicts performance characteristics of the EM apparatus of FIG. 15, in accordance with an embodiment.
Figure 18:
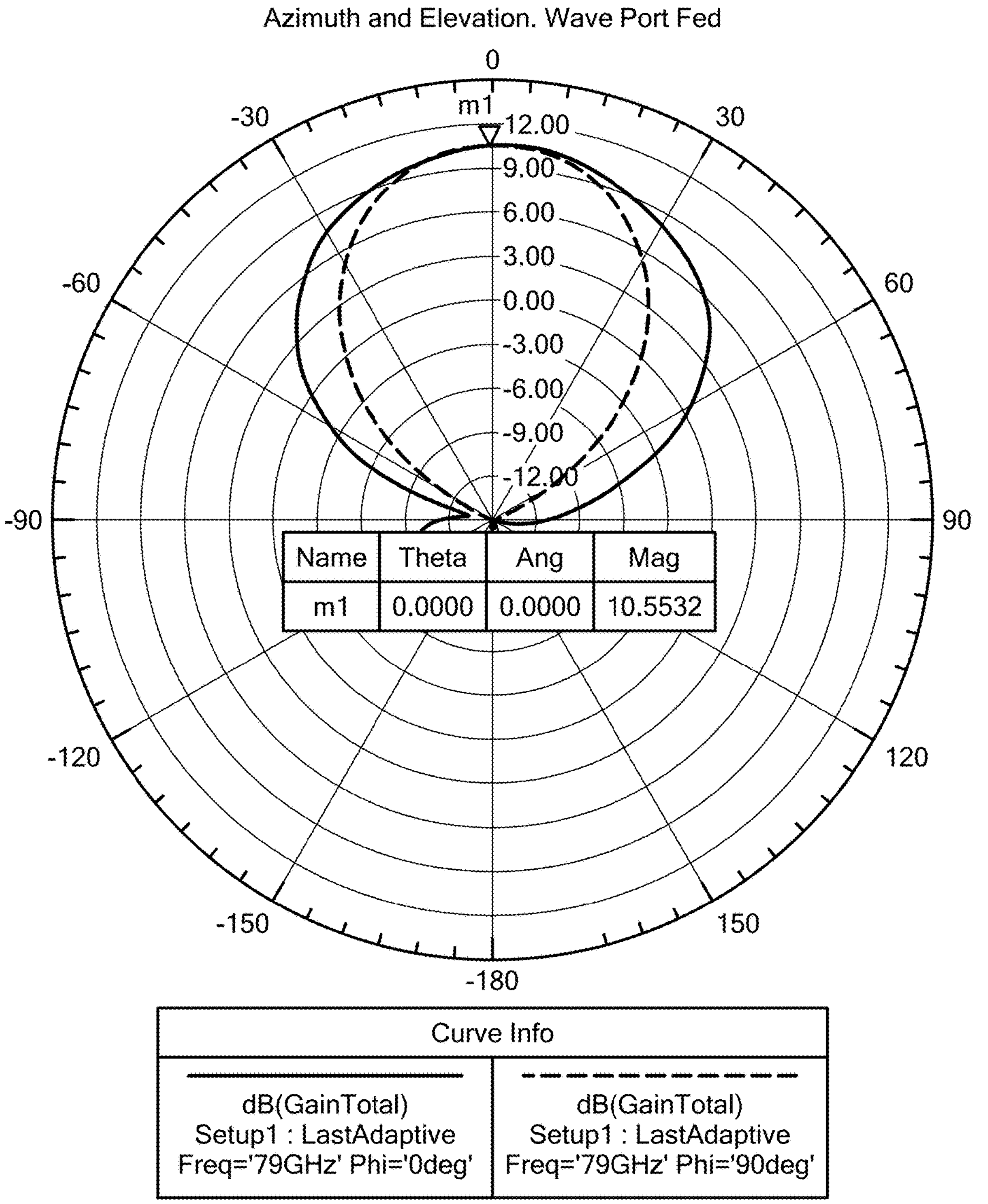
FIG. 18 depicts performance characteristics of the EM apparatus of FIG. 15, in accordance with an embodiment.
Figure 19A:
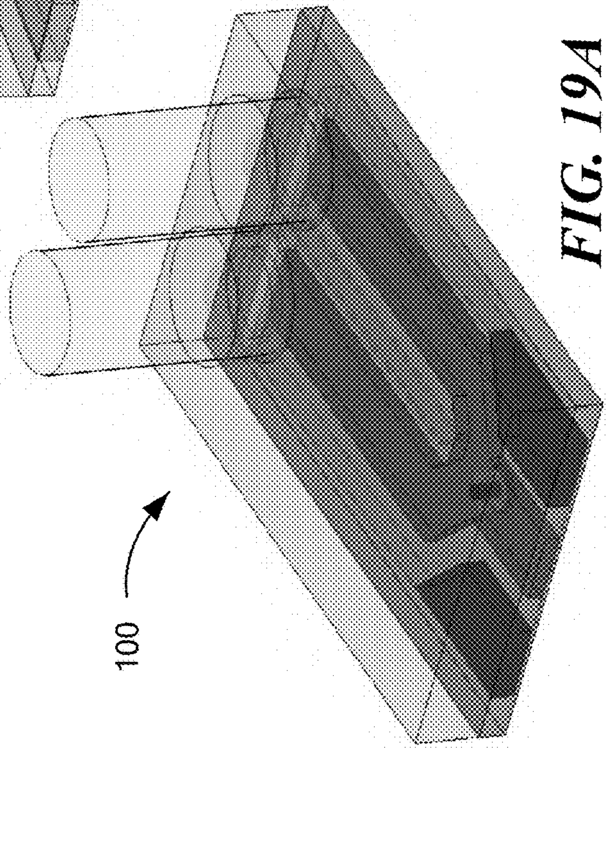
FIGS. 19A, 19B, and 19C, depict various performance characteristics of the EM apparatus of FIG. 15, in accordance with an embodiment.
Figure 19B:
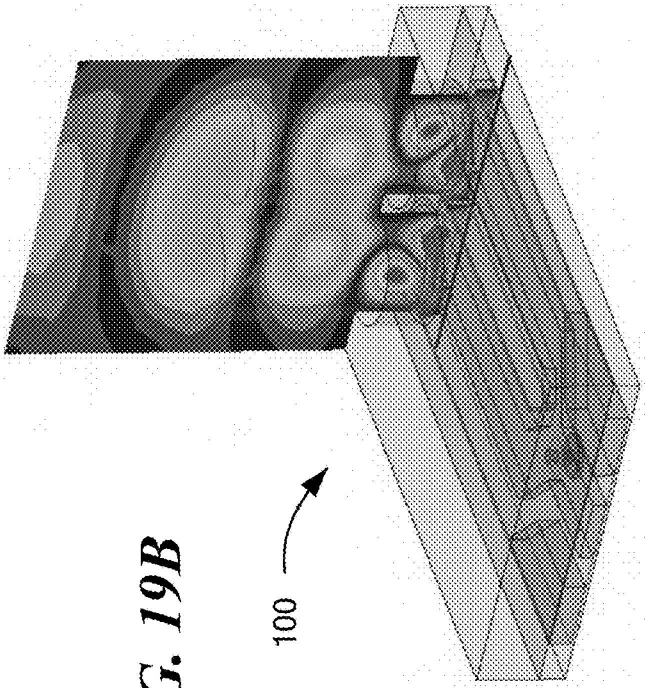
Figure 19C:
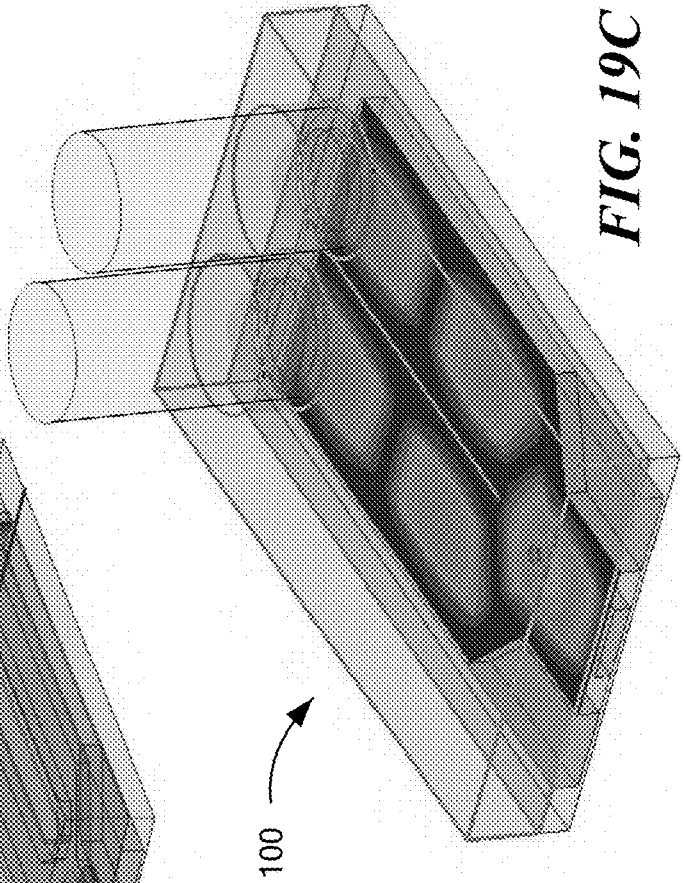
Figure 20:
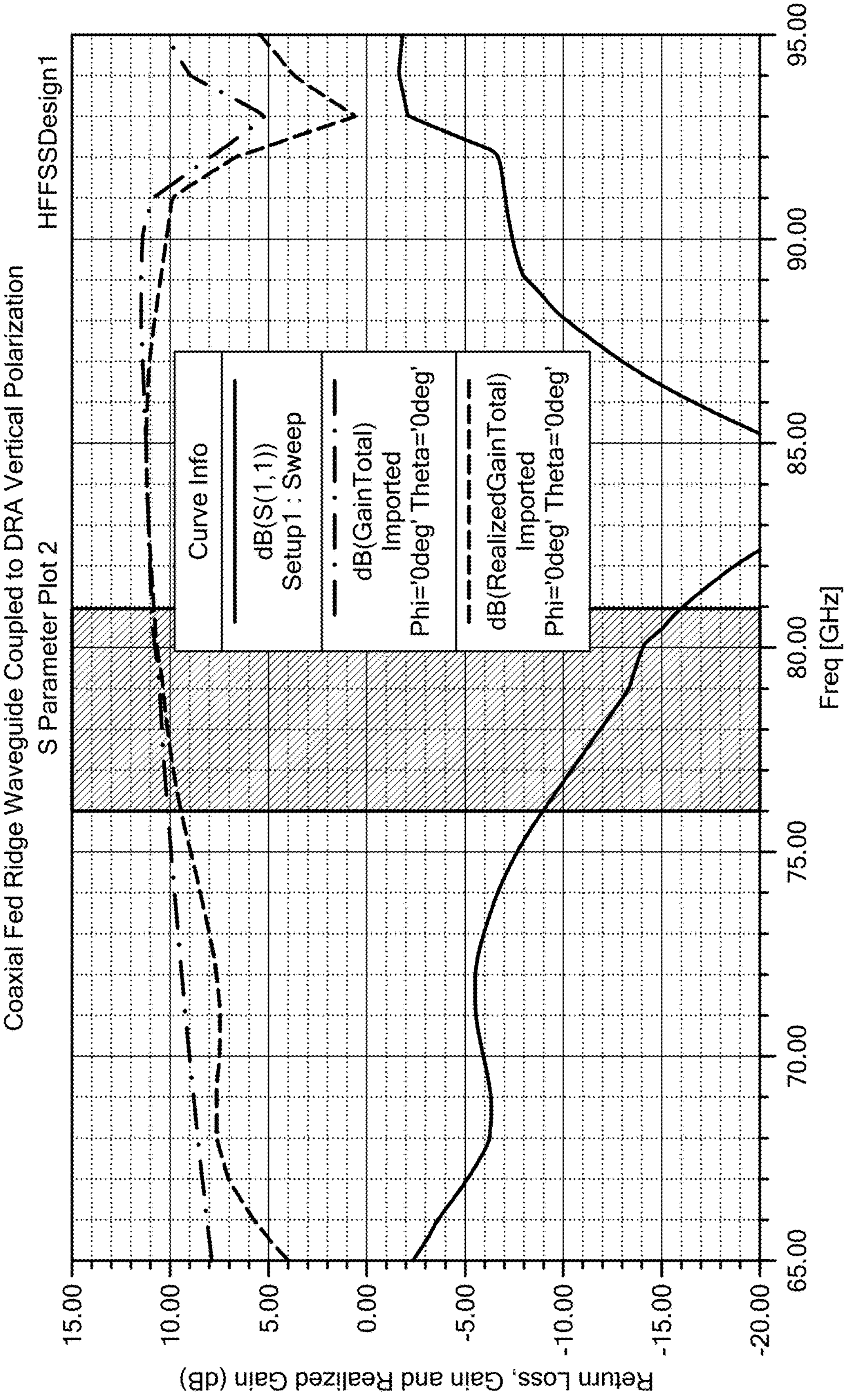
FIG. 20 depicts performance characteristics of the EM apparatus of FIG. 19A, in accordance with an embodiment.
Figure 21:
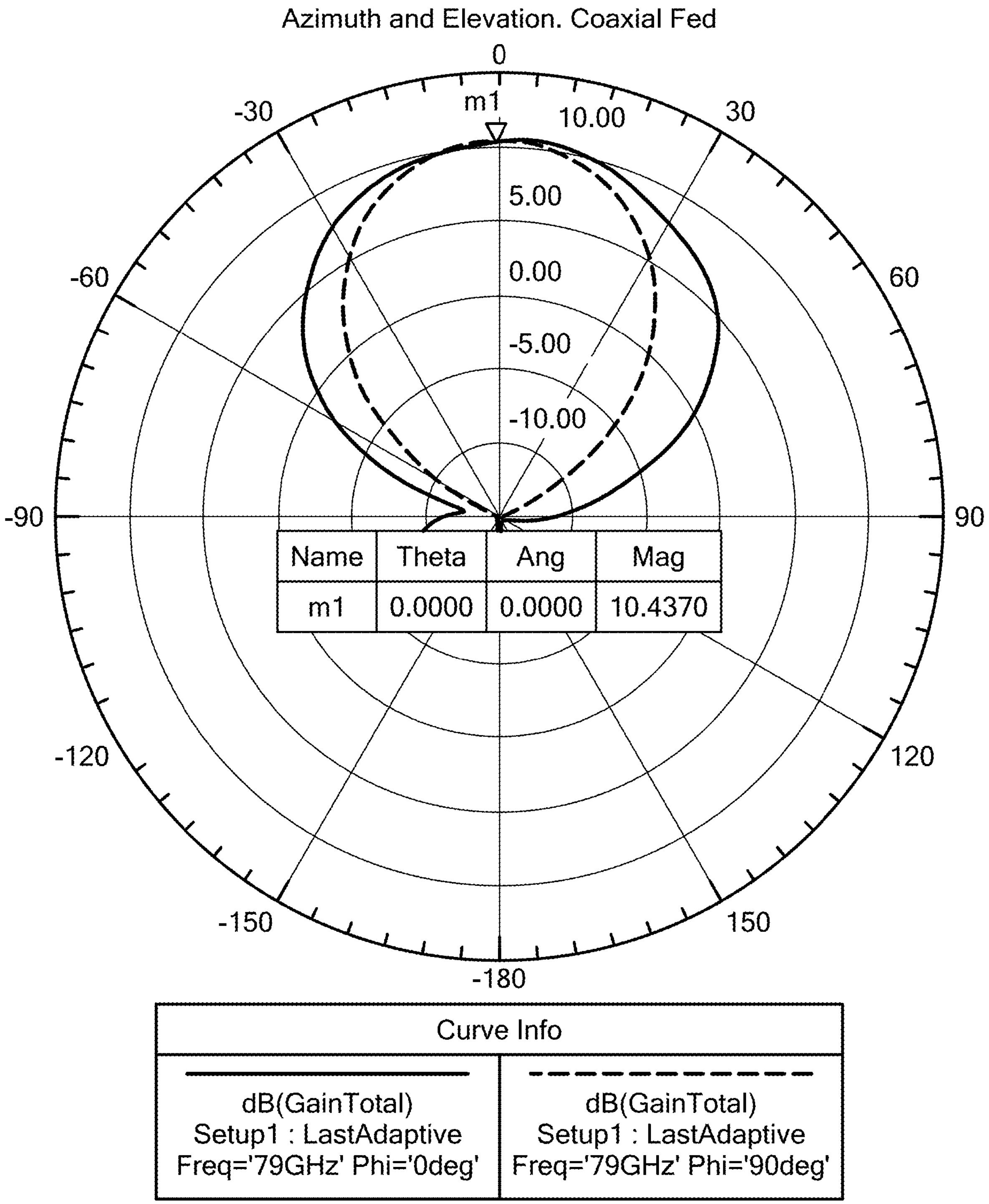
FIG. 21 depicts performance characteristics of the EM apparatus of FIG. 19A, in accordance with an embodiment.

FIGS. 17-21 depict various performance characteristics of the EM apparatus 100 of FIGS. 14A-14B with the coaxial signal feed 260' depicted in FIG. 15. For example: FIG. 17 depicts return loss, gain, and realized gain, EM performance characteristics of the EM apparatus of FIG. 15; FIG. 18 depicts azimuth and elevation EM performance characteristics of a wave port fed one of the EM apparatus of FIG. 15; FIGS. 19A-9C depict various EM performance characteristics of the EM apparatus of FIG. 15; FIG. 20 depicts coaxial-fed ridge-waveguide-coupled-to-DRA vertical polarization EM performance characteristics of the EM apparatus of FIG. 19A; and, FIG. 21 depicts azimuth and elevation EM performance characteristics of a coaxial fed one of the EM apparatus of FIG. 19A.

Figure 22B:
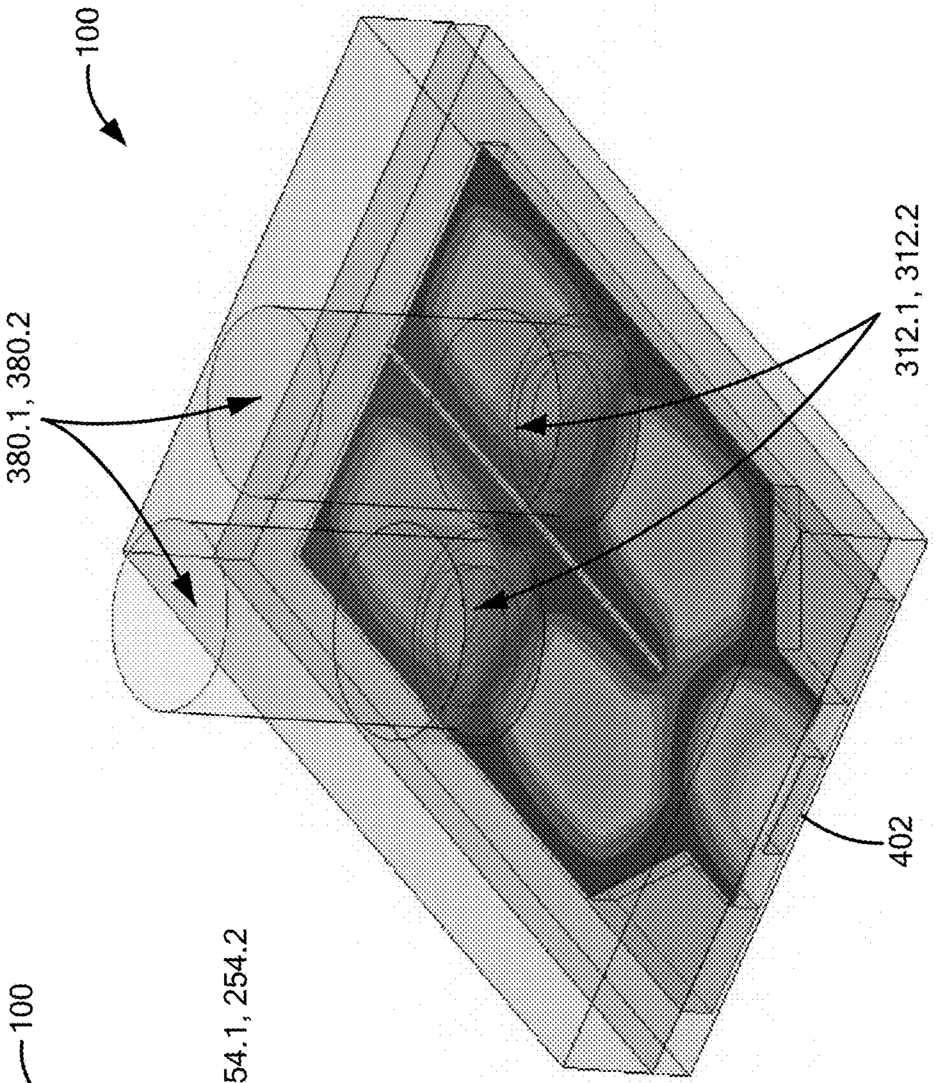
FIGS. 22A and 22B respectively depict an EM apparatus similar to that of FIGS. 14A and 14B, but with an input port signal feed, and slotted output signal feeds halfway down the waveguide, in accordance with an embodiment.
Figure 22A:
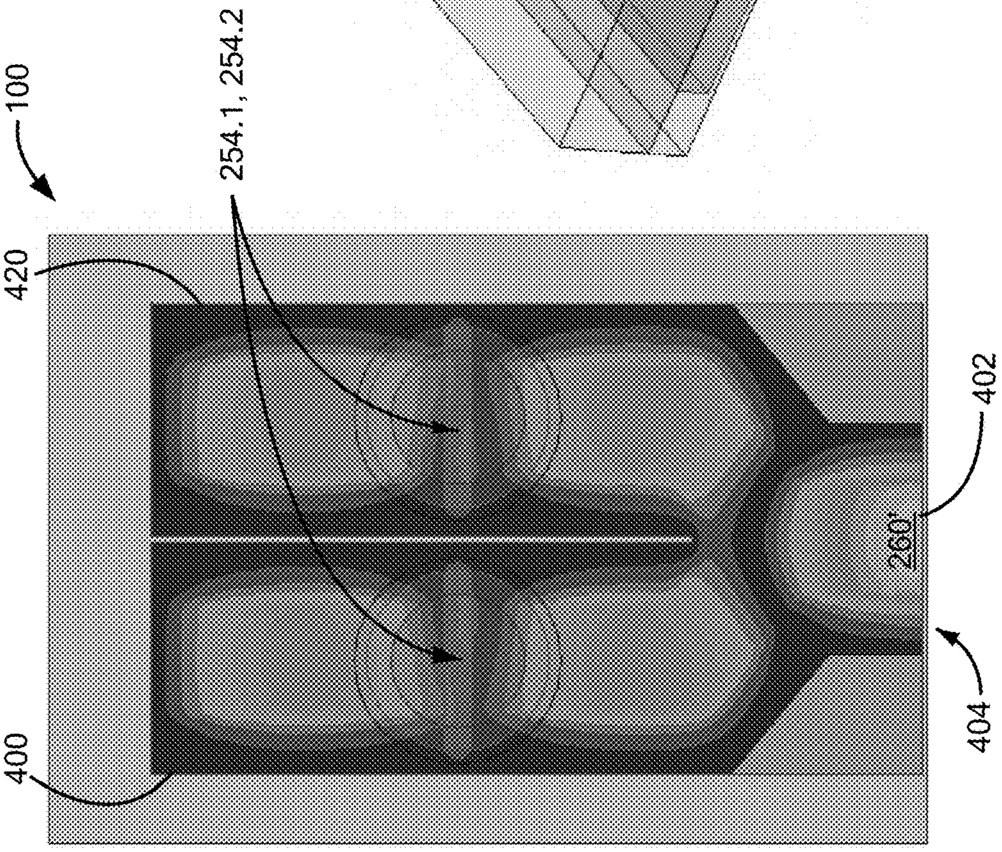
Figure 23:
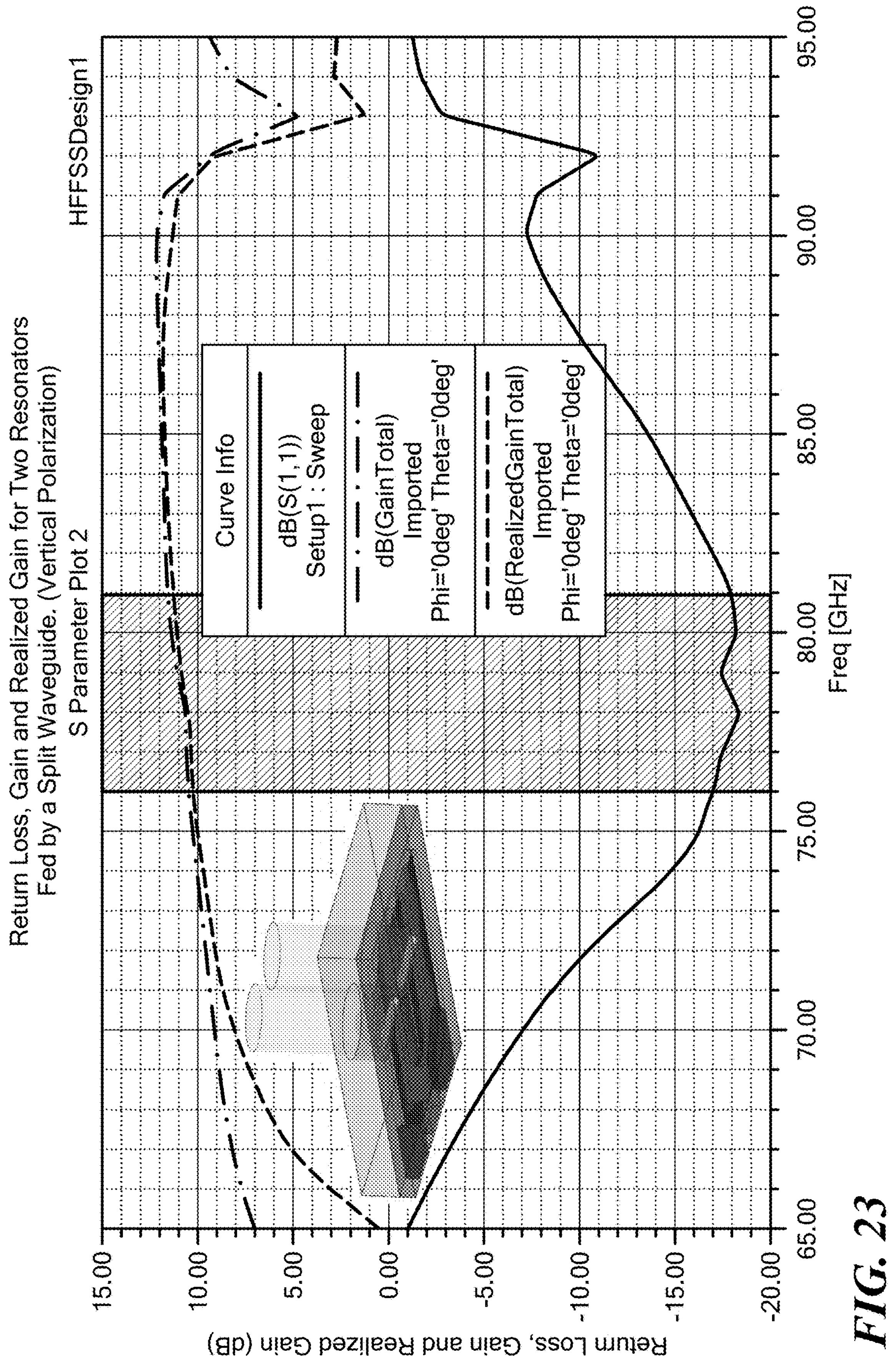
FIG. 23 depicts performance characteristics of the EM apparatus of FIGS. 22A and 22B, in accordance with an embodiment.
Figure 24:
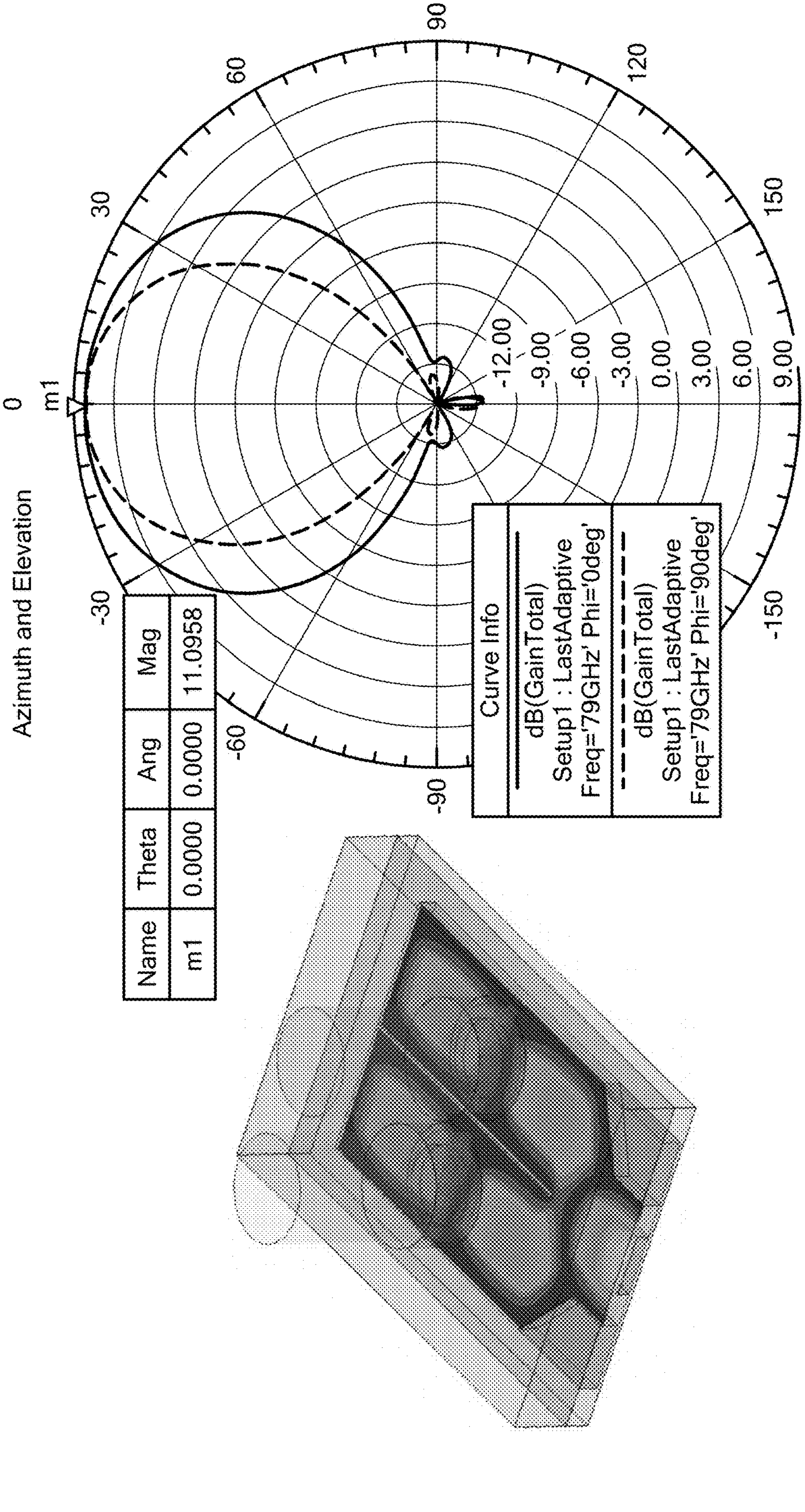
FIG. 24 depicts performance characteristics of the EM apparatus of FIGS. 22A and 22B, in accordance with an embodiment.

Reference is now made to FIGS. 22A-24, where: FIGS. 22A and 22B respectively depict an EM apparatus 100 similar to that of FIGS. 14A and 14B, but with a signal input port 402 at the first end 404 of the AWGs 400, 420 (compare to FIGS. 14A-15), and slotted output signal feeds 254.1, 254.2 halfway down the waveguides 400, 420 (compare to FIGS. 13A-13C); FIG. 23 depicts return loss, gain, and realized gain, EM performance characteristics of the EM apparatus 100 of FIGS. 22A- 22B where two resonators are fed by a split waveguide operating with vertical polarization; and, FIG. 24 depicts azimuth and elevation EM performance characteristics of the EM apparatus 100 of FIGS. 22A-22B.

Similar to the EM apparatus 100 depicted in FIGS. 13A-13C, but with reference still to FIGS. 22A-22B, an embodiment of the EM apparatus 100 has a first AWG 400 with a first ridge projection 216, and a second AWG 420 with a second ridge projection 226, where the second AWG 420 and the second ridge projection 226 are disposed, respectively, parallel to the first AWG 400 and the first ridge projection 216. The first end 404 of the first AWG 400 is conjoined with the first end 424 of the second AWG 420 via the power divider junction 600, such that the first signal port 260 is a common signal port to both the first AWG 400 and the second AWG 420. The second signal port 262 is disposed at an intermediate distance between the first end 404 and the second end 406 of the first AWG 400, and the third signal port 264 is disposed at an intermediate distance between the first end 424 and the second end 426 of the second AWG 420, the second end 426 of the second AWG 420 is disposed at a distance from the first end 424 of the second AWG 420. The first AWG 400 and the second AWG 420 are separated by an electrically conductive wall 290 disposed therebetween, the electrically conductive wall 290 extending between and electrically connected to the floor 472 and the ceiling 476 of the first AWG 400 and the second AWG 420.

In an embodiment, the second signal port 262 includes a first elongated slotted aperture 254.1 having a lengthwise direction of elongation across a width of the first AWG 400, and the third signal port 264 includes a second elongated slotted aperture 254.2 having a lengthwise direction of elongation across a width of the second AWG 420.

In an embodiment, a first DRA 312.1 is disposed at the second signal port 262 over the first elongated slotted aperture 254.1, and a second DRA 312.2 is disposed at the third signal port 264 over the second elongated slotted aperture 254.2.

In an embodiment, a first dielectric beam shaper 380.1 is disposed on top of the first DRA 312.1, and a second dielectric beam shaper 380.2 is disposed on top of the second DRA 312.2. In an embodiment, the first dielectric beam shaper 380.1 substantially or completely encloses the first DRA 312.1, and the second dielectric beam shaper 380.2 substantially or completely encloses the second DRA 312.2. In an embodiment, and with reference to FIG. 14 in combination with FIG. 22, the first DRA 312.1 has an overall height A1, the first dielectric beam shaper 380.1 has an overall height B1, and B1>A1, and the second DRA 312.2 has an overall height A2, the second dielectric beam shaper 380.2 has an overall height B2, and B2>A2. In an embodiment, B1 is equal to or greater than 2 times A1, and B2 is equal to or greater than 2 times A2.

In an embodiment, the second DRA 312.1 has a same shape, size, and composition, as the first DRA 312.1, and the second dielectric beam shaper 380.2 has a same shape, size, and composition, as the first dielectric beam shaper 380.1.

Similar to the EM apparatus 100 of FIGS. 14A-14B, and with reference to FIGS. 14A-14B in combination with FIGS. 22A-22B, the EM apparatus 100 depicted in FIGS. 22A-22B is configured such that the first AWG 400 and the second AWG 420 in combination provide a first portion 200 of the EM apparatus 100, and further wherein the EM apparatus 100 includes a second portion 300 disposed on top of the first portion 200, the second portion 300 having a first top-down recess 306.1 that is axially centrally aligned with the first elongated slotted aperture 254.1 of the first portion 200, and a second top-down recess 306.2 that is axially centrally aligned with the second elongated slotted aperture 254.2 of the first portion 200, wherein the second portion 300, including the first and second top-down recesses 306.1, 306.2, has electrically conductive surfaces. As will be recognized by comparing the EM apparatus 100 of FIGS. 22A-22B with that of FIGS. 14A-14B, a difference between the two embodiments is in the location of the elongated slotted apertures 254.1, 254.2 and the corresponding top-down recesses 306.1, 306.2, where FIGS. 14A-14B has them located at the end of the waveguides 400, 420, and FIGS. 22A-22B has them located not at the end of the waveguides 400, 420, such as midway between the ends of the waveguides 400, 420.

In an embodiment, the first and second top-down recesses 306.1, 306.2 with electrically conductive surfaces form EM reflectors. In an embodiment, and best seen with reference to FIG. 16, the second portion 300 has an overall height H2, each one of the first top-down recess 306.1 and the second top-down recess 306.2 has a corresponding floor 308 at a depth d2, where d2<H2, and each corresponding floor 308 has an aperture 310.1, 310.2 that mimics a corresponding one of the first elongated slotted aperture 254.1 and the second elongated slotted aperture 254.2 of the first portion 200.

In an embodiment, the first DRA 312.1 is disposed within the first top-down recess 306.1, and the second DRA 312.2 is disposed within the second top-down recess 306.2. In an embodiment, the first dielectric beam shaper 380.1 is disposed within the first top-down recess 306.1, and the second dielectric beam shaper 380.2 is disposed within the second top-down recess 306.2. In an embodiment, and as depicted in FIGS. 22A-22B, a waveguide signal feed 260' is disposed at the first signal input port 402.

Figure 25B:
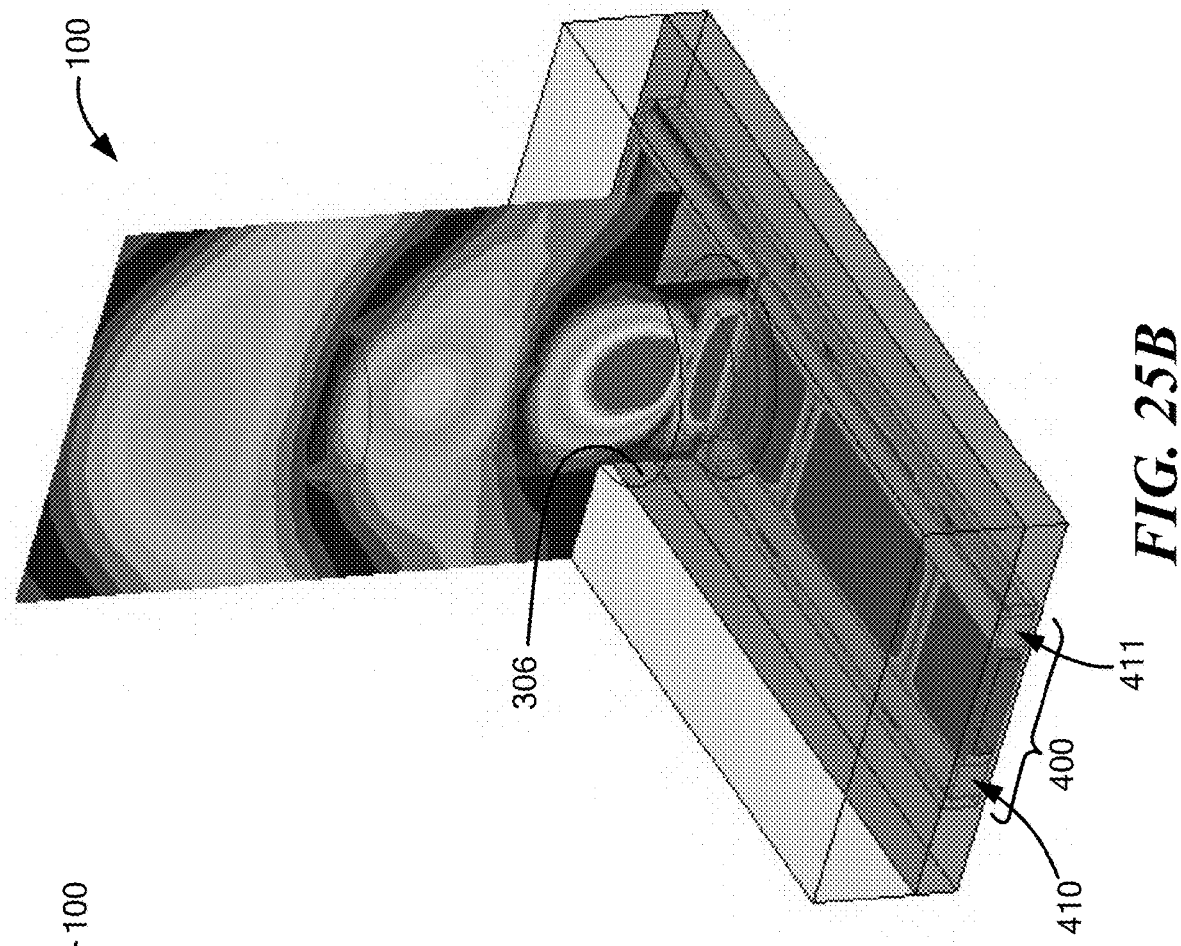
FIGS. 25A and 25B respectively depict a front view, and a rotated isometric view of an EM apparatus similar to that of FIGS. 19A-19C, but with a single waveguide having dielectric loaded material, and associated performance characteristics, in accordance with an embodiment.
Figure 25A:
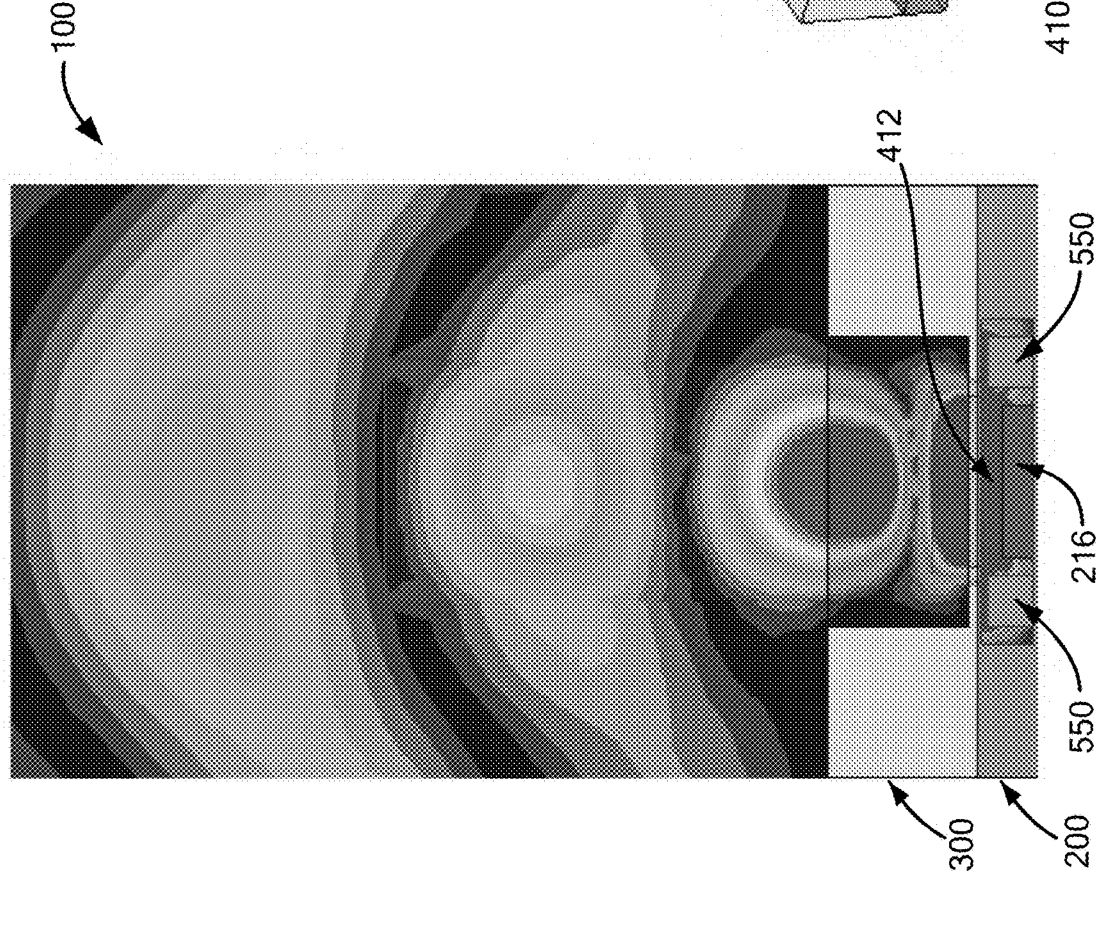
Figure 26:
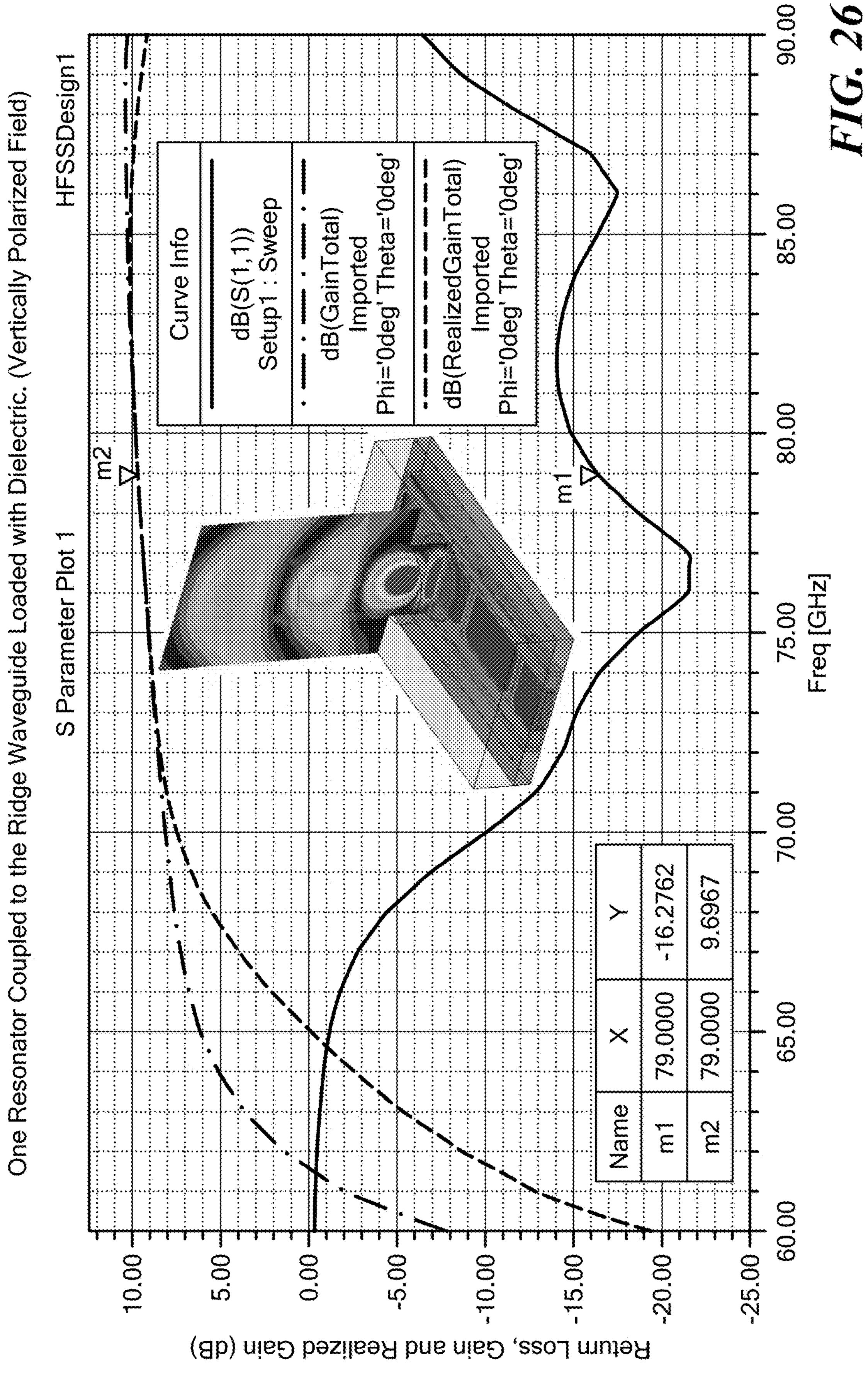
FIG. 26 depicts the EM apparatus and other associated performance characteristics of FIG. 25B, in accordance with an embodiment.
Figure 27:
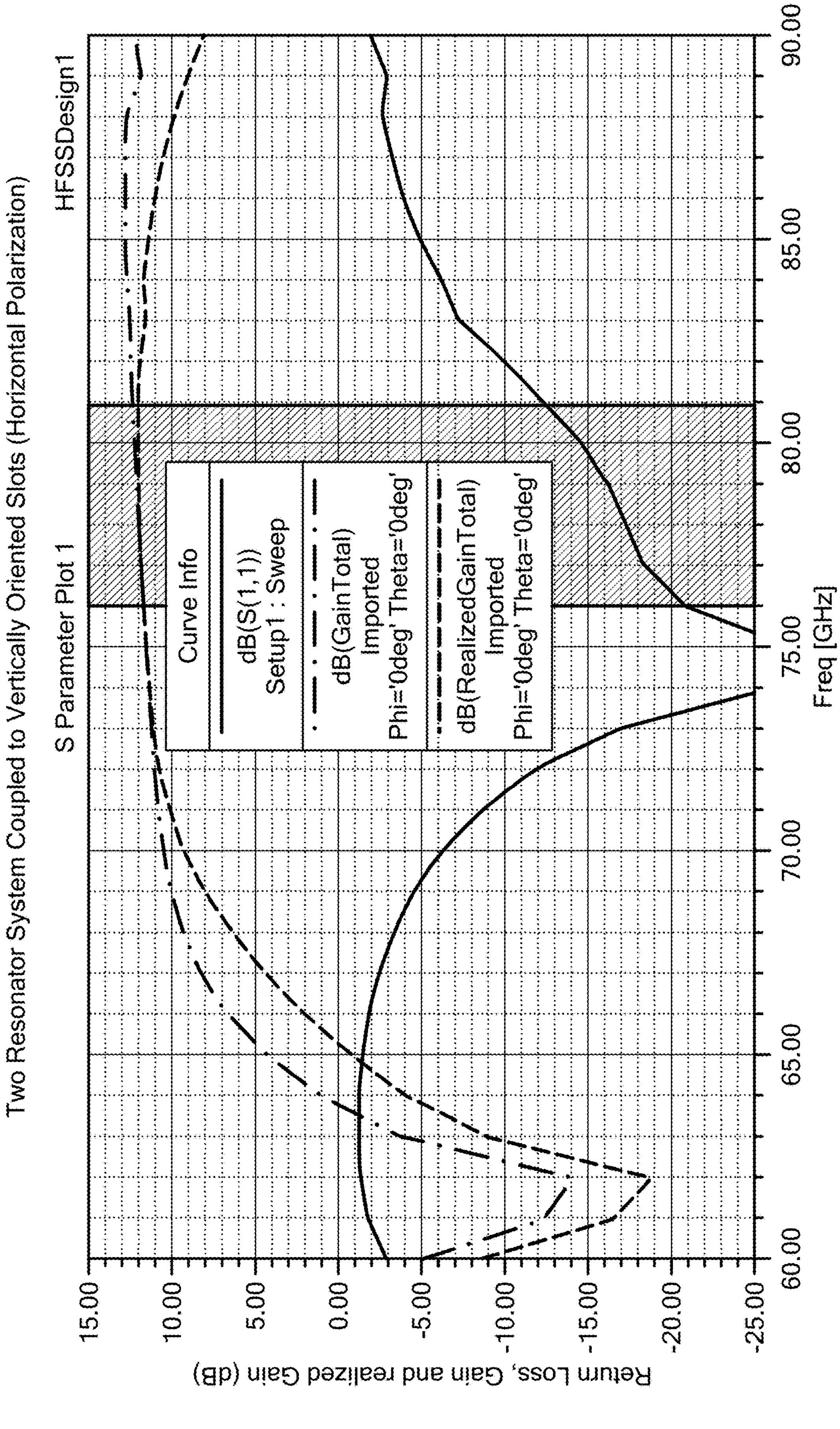
FIG. 27 depicts performance characteristics of the EM apparatus of FIG. 26, in accordance with an embodiment.

Reference is now made to FIGS. 25A-27, where FIGS. 25A-25B depict a front view and a rotated transparent isometric rotated view of an EM apparatus 100 similar to that of FIGS. 19A-19C, but with a single waveguide 400 having dielectric loaded material 550 disposed within the waveguide 400, and FIGS. 26-27 depict associated performance characteristics of the EM apparatus 100 of FIGS. 25A-25B. In an embodiment of EM apparatus 100, the waveguide 400 or waveguide 420 is at least partially loaded with a dielectric medium (dielectric loading) 550. In an embodiment, the dielectric loading material 550 has an average dielectric constant equal to or greater than 2 and equal to or less than 15.

Figure 28A:
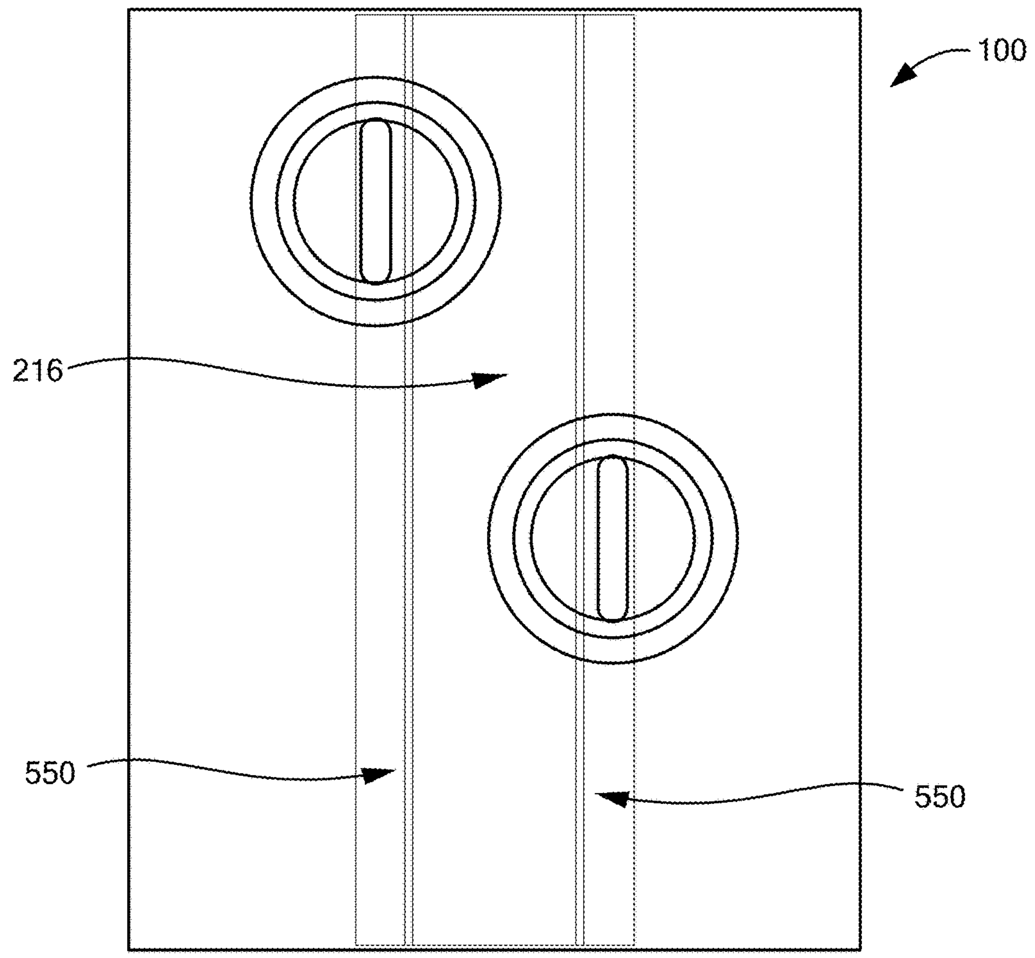
FIGS. 28A, 28B, and 28C, respectively depict a top down plan view, a front view, and a rotated transparent isometric view, of an EM apparatus similar to that of FIGS. 8A and 8B, but with a dielectric loaded waveguide, and associated performance characteristics in accordance with an embodiment.
Figure 28B:
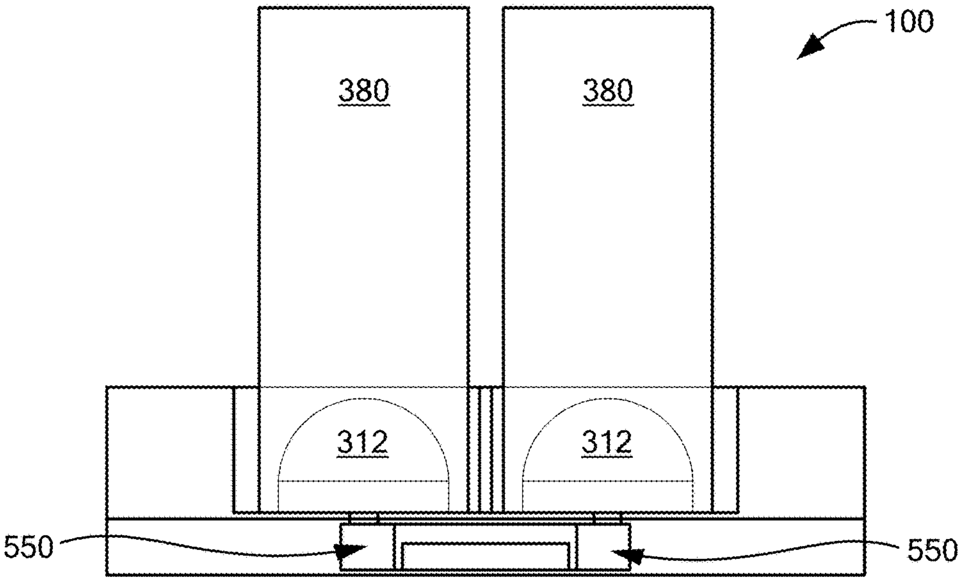
Figure 28C:
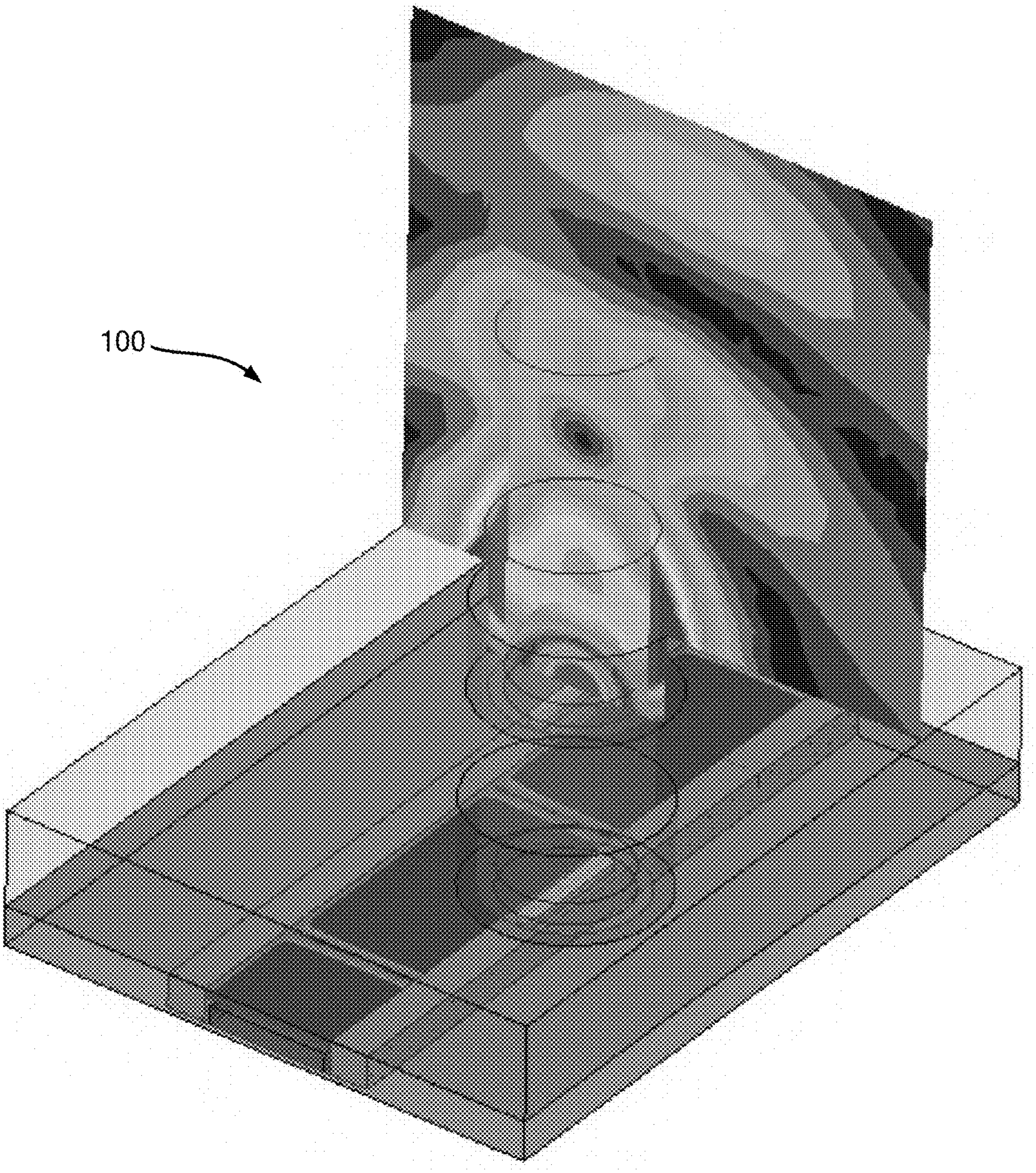

With reference now to FIGS. 28A-28C, in combination with FIGS. 25A-25B, 12A-12B, and 8A-8B, an EM apparatus 100 includes a first portion 200 having an EM waveguide 400 having an internal overall height H, the waveguide 400 having a centrally disposed ridge projection 216 with a height h that extends from an electrically conductive floor 472 of the waveguide 400 toward an electrically conductive ceiling 476 of the waveguide 400, wherein h<H (see FIGS. 8*a*-8B and 12A-12B, for example). The EM apparatus 100 further includes a second portion 300 disposed on and electrically connected to the first portion 200, the second portion 300 having a recess 306 surrounded by an electrically conductive material (surface of the recess) that is electrically connected with the first portion 200, wherein the recess 306 is configured to receive a dielectric resonator antenna 312, wherein the waveguide 400 has first EM paths 410, 411 on each side of the ridge projection 216, and a second EM path 412 above the ridge projection 216, wherein the first EM paths 410, 411 are at least partially loaded with a dielectric loading material 550. As a general comparison, the EM apparatus 100 of FIGS. 28A-28C is similar to that of FIGS. 8A-8B with respect to placement of the recesses 306, but with a waveguide 400 having dielectric loading 550, herein referred to as a dielectric loaded waveguide. Performance characteristics of the dielectric loaded waveguide of FIGS. 28A-28C are also depicted in FIG. 28C.

In view of all of the foregoing, it will be appreciated that various aspects of an embodiment are disclosed herein, which are in accordance with, but not limited to, at least the following aspects and/or combinations of aspects.

Aspect 1. An electromagnetic, EM, apparatus, comprising: a first portion comprising a first mating surface; and a second portion comprising a second mating surface configured to be disposed on the first mating surface of the first portion; wherein the first portion has an overall height H1, the first portion comprising: an open-top structure having an upper surface profile having at least one top-down cavity comprising air and having a depth d1 where d1<H1; wherein each of the at least one top-down cavity has corresponding side walls; wherein outer exposed surfaces of the at least one top-down cavity with the corresponding side walls comprises an electrical conductor; wherein corresponding ones of the at least one top-down cavity with the corresponding side walls forms a lower portion of an air waveguide, AWG; wherein the second portion has an overall height H2, the second portion comprising: a lower surface profile configured to mate with the upper surface profile of the first portion; an upper surface profile having at least one top-down recess having a corresponding floor at a depth d2 where d2<H2; a bottom opening in each respective floor of the at least one top-down recess; wherein each of the at least one top-down recess is at least partially filled with a dielectric medium having a relative dielectric constant greater than that of air that covers the corresponding bottom opening; wherein portions of the lower surface profile proximate each bottom opening comprises an electrical conductor and forms an upper portion of the AWG.

Aspect 2. The EM apparatus of Aspect 1, wherein: each of the dielectric medium is disposed on top of an adhesive, wherein the corresponding dielectric medium, adhesive, or combination of dielectric medium and adhesive, is disposed on the corresponding floor of each respective top-down recess and in each bottom opening of each corresponding floor.

Aspect 3. The EM apparatus of any one of Aspects 1 to 2, wherein: at least one of the first portion and the second portion comprises a metallized plastic.

Aspect 4. The EM apparatus of any one of Aspects 1 to 2, wherein: at least one of the first portion and the second portion comprises a composite of multiple portions attached to each other.

Aspect 5. The EM apparatus of any one of Aspects 1 to 4, wherein: each one of the at least one top-down recess comprises a wall that surrounds a respective one of the dielectric medium disposed therein.

Aspect 6. The EM apparatus of any one of Aspects 1 to 5, wherein: surfaces of the at least one top-down recess, including the corresponding surrounding wall and corresponding floor, comprises an electrical conductor.

Aspect 7. The EM apparatus of Aspect 6, wherein: the surrounding wall, with the electrical conductor, of each respective top-down recess forms an electrically conductive electromagnetic, EM, reflector that substantially surrounds the dielectric medium disposed within the corresponding top-down recess.

Aspect 8. The EM apparatus of any one of Aspects 1 to 7, wherein: the second portion is attached to the first portion at the first and second mating surfaces.

Aspect 9. The EM apparatus of any one of Aspects 1 to 8, wherein: the first portion, at a top surface of the side walls of corresponding ones of the at least one top-down cavity, further comprises an interlocking engagement feature; and the second portion, at the lower surface of the second portion proximate the interlocking engagement feature of the first portion, further comprises a complementary interlocking engagement element configured to interlock with a corresponding interlocking engagement feature of the first portion.

Aspect 10. The EM apparatus of Aspect 9, wherein: the interlocking engagement feature of the first portion comprises an engagement recess, and wherein the complementary interlocking engagement element of the second portion comprises an engagement projection configured to fittingly engage with the engagement recess of the first portion.

Aspect 11. The EM apparatus of any one of Aspects 1 to 10, wherein the first portion further comprises: a ridge projection having a height h1, where h1<d1, disposed within each of the at least one top-down cavity, the ridge projection having electrically conductive surfaces.

Aspect 12. The EM apparatus of Aspect 11, wherein: each respective ridge projection is disposed in an opposing relationship with a corresponding one of the bottom opening in each respective floor of the at least one top-down recess of the second portion.

Aspect 13. The EM apparatus of any one of Aspects 1 to 12, wherein: each of the dielectric medium is integrally connected to another adjacent one of the dielectric medium by a relatively thin connecting structure to form a monolithic dielectric medium structure.

Aspect 14. The EM apparatus of any one of Aspects 1 to 13, wherein: each of the bottom opening in each respective floor of the at least one top-down recess forms an electromagnetic, EM, signal feed aperture.

Aspect 15. The EM apparatus of any one of Aspects 1 to 14, wherein: the second portion is formed completely of metal.

Aspect 16. The EM apparatus of any one of Aspects 1 to 14, wherein: the second portion is formed from a metal-coated dielectric material.

Aspect 17. The EM apparatus of any one of Aspects 1 to 14, wherein: the second portion is formed from a metal-coated molded or 3D printed dielectric material Aspect 18. The EM apparatus of any one of Aspects 1 to 17, wherein: each of the at least one top-down recess has tapered sidewalls that taper inward from top-to-bottom; and wherein each of the dielectric medium has a 3D shape that conforms to the tapered sidewalls of a corresponding one of the at least one top-down recess.

Aspect 19. The EM apparatus of any one of Aspects 1 to 18, wherein: each of the dielectric medium has a 3D shape in the form of a trapezoidal prism.

Aspect 20. The EM apparatus of any one of Aspects 10 to 19, wherein: each of the dielectric medium has a relative dielectric constant equal to or greater than 2 and equal to or less than 15.

Aspect 21. An electromagnetic, EM, apparatus, comprising: a first portion comprising an EM signal feed; and a second portion disposed on the first portion, the second portion comprising a shaped metallized form having at least one shaped metallized cavity, the second portion further comprising a dielectric medium disposed within each of the at least one shaped metallized cavity such that respective ones of the dielectric medium has a 3D shape that conforms to a shape of a corresponding one of the at least one shaped metallized cavity.

Aspect 22. The EM apparatus of Aspect 21, wherein: the EM signal feed of the first portion comprises an EM waveguide; each of the at least one shaped metallized cavity of the second portion comprises a bottom opening; the upper surface of the first portion further comprises an electrically conductive surface comprising at least one aperture disposed in a one-to-one corresponding relationship with each bottom opening of the second portion.

Aspect 23. The EM apparatus of Aspect 22, wherein: the EM signal feed of the first portion comprises a substrate integrated waveguide, SIW.

Aspect 24. The EM apparatus of Aspect 21, wherein: the second portion further comprises an EM feed structure disposed in signal communication with each of the at least one shaped metallized cavity; and the first portion comprises an EM signal feed input disposed in signal communication with the EM feed structure of the second portion.

Aspect 25. The EM apparatus of Aspect 24, wherein: the EM feed structure of the second portion comprises air or a dielectric material other than air.

Aspect 26. The EM apparatus of Aspect 24, wherein: the EM signal feed input of the first portion comprises a coaxial cable.

Aspect 27. An electromagnetic, EM, apparatus, comprising: an EM signal feed; an air waveguide, AWG, disposed in signal communication with the EM signal feed; and at least one dielectric loaded launch disposed in signal communication with and between the EM signal feed and the AWG.

Aspect 28. The EM apparatus of Aspect 27, wherein: the AWG comprises a signal input port disposed in signal communication with the EM signal feed, and the at least one dielectric loaded launch is disposed at the signal input port.

Aspect 29. The EM apparatus of any one of Aspects 27 to 28, wherein: each one of the at least one dielectric loaded launch comprises a dielectric medium having a relative dielectric constant equal to or greater than 2 and equal to or less than 15.

Aspect 30. The EM apparatus of any one of Aspects 27 to 29, wherein: the EM signal feed comprises a plurality of transmit or receive channels, and a respective one of the at least one dielectric loaded launch is disposed in signal communication with and between the AWG and a corresponding one of the plurality of transmit or receive channels.

Aspect 31. The EM apparatus of any one of Aspects 27 to 30, wherein: the EM signal feed comprises an RF chip, a SIW, a microstrip, a stripline, a slotted aperture, or a patch.

Aspect 32. An electromagnetic, EM, apparatus, comprising: an EM signal feed; an air waveguide, AWG, comprising a plurality of antenna ports, and an EM divider network disposed in signal communication with and between the plurality of antenna ports and the EM signal feed, the EM divider network providing a power dividing signal path between corresponding ones of the plurality of antenna ports and the EM signal feed; and a plurality of dielectric loaded medium disposed at, and in one to one correspondence with, the plurality of antenna ports.

Aspect 33. An electromagnetic, EM, apparatus, comprising: a first portion comprising: an air waveguide, AWG, having electrically conductive internal surfaces; a ridge projection that extends lengthwise within the AWG, the ridge projection having electrically conductive surfaces within the AWG; a first plurality of wall projections that extend at least partially across a gap between a top surface and a bottom surface of the AWG, the first plurality of wall projections being disposed on one side of the ridge projection and distributed in a direction parallel to the ridge projection, the first plurality of wall projections having electrically conductive surfaces within the AWG; a second plurality of wall projections that extend at least partially across a gap between a top surface and a bottom surface of the AWG, the second plurality of wall projections being disposed on an opposing side of the ridge projection and distributed in a direction parallel to the ridge projection, the second plurality of wall projections having electrically conductive surfaces within the AWG; wherein an upper surface of the AWG comprises; a first aperture disposed between the ridge projection and the first plurality of wall projections on a first side of the ridge projection, and a second aperture disposed between the ridge projection and the second plurality of wall projections on a second opposing side of the ridge projection; wherein the second aperture is longitudinally displaced relative to the first aperture along a length of the AWG such that the first and second apertures are not directly across from each other on opposing sides of the ridge projection.

Aspect 34. The EM apparatus of Aspect 33, wherein: the first plurality of wall projections comprise a first row of wall projections that extend only partially from the bottom surface of the AWG toward the top surface of the AWG, and a second row of wall projections that extend only partially from the top surface of the AWG toward the bottom surface of the AWG; and the second plurality of wall projections comprise a third row of wall projections that extend only partially from the top surface of the AWG toward the bottom surface of the AWG, and a fourth row of wall projections that extend only partially from the bottom surface of the AWG toward the top surface of the AWG.

Aspect 35. The EM apparatus of Aspect 34, wherein: the first row of wall projections are outboard of the second row of wall projections relative to the ridge projection; and the fourth row of wall projections are outboard of the third row of wall projections relative to the ridge projection.

Aspect 36. The EM apparatus of any one of Aspects 33 to 35, wherein: the ridge projection comprises a metal coated dielectric material.

Aspect 37. The EM apparatus of any one of Aspects 33 to 36, further comprising: a second portion disposed on top of the first portion, the second portion comprising a first top-down recess that is axially centrally aligned with the first aperture, and a second top-down recess that is axially centrally aligned with the second aperture; wherein the second portion, including the first and second top-down recesses, comprises electrically conductive surfaces.

Aspect 38. The EM apparatus of Aspect 37, wherein: the first and second top-down recesses with the electrically conductive surfaces form EM reflectors.

Aspect 39. The EM apparatus of any one of Aspects 37 to 38, wherein: the second portion has an overall height H2; each one of the first top-down recess and the second top-down recess has a corresponding floor at a depth d2 where d2<H2; and each corresponding floor has an aperture that mimics a corresponding one of a first aperture and a second aperture of the first portion.

Aspect 40. The EM apparatus of any one of Aspects 37 to 39, further comprising: a dielectric resonator antenna, DRA, disposed in each one of the first top-down recess and the second top-down recess of the second portion in such a manner as to cover respective ones of the first and second apertures of the first portion.

Aspect 41. The EM apparatus of any one of Aspects 33 to 40, wherein: the AWG further comprises a signal input port; and the first portion further comprises a signal feed disposed to electromagnetically excite the signal input port of the AWG.

Aspect 42. The EM apparatus of Aspect 41, wherein: the signal feed comprises a coaxial cable.

Aspect 43. An electromagnetic, EM, apparatus, comprising: an air waveguide, AWG, comprising: as viewed in an axial cross section of the AWG, an elongated housing comprising a contiguous arrangement of a floor, a first wall, a ceiling, and a second wall, wherein the floor, the first wall, the ceiling, and the second wall, each comprise an electrically conductive material, the housing having a distance H between the floor and the ceiling; as viewed in the axial cross section of the AWG, a centrally disposed elongated ridge that extends from the floor, wherein outer surfaces of the ridge comprise an electrically conductive material, the ridge having a height h where $h<H$; a first signal port disposed at a first end of the AWG; a second signal port disposed at a second end of the AWG, the second end disposed at a distance from the first end; a first aperture at the first signal port that extends contiguously through the floor and the ridge; and a second aperture at the second signal port that extends contiguously through the floor and the ridge.

Aspect 44. The EM apparatus of Aspect 43, further comprising: a first EM signal feed disposed in signal communication with the first signal port.

Aspect 45. The EM apparatus of Aspect 44, wherein: the first EM signal feed comprises a coaxial signal feed that extends through the first aperture, wherein a signal line of the coaxial signal feed extends into the AWG between a top of the ridge and the ceiling of the AWG.

Aspect 46. The EM apparatus of any one of Aspects 44 to 45, further comprising: a second EM signal feed disposed in signal communication with the second signal port.

Aspect 47. The EM apparatus of Aspect 46, wherein: the first EM signal feed is a transmit signal feed, and the second EM signal feed is a receive signal feed configured to receive an EM signal from the first EM signal feed via the AWG.

Aspect 48. The EM apparatus of any one of Aspects 43 to 47, wherein: an interior volume of the AWG confined by the floor, the first wall, the ceiling, and the second wall, of the AWG, and by the outer surfaces of the ridge, comprises air.

Aspect 49. The EM apparatus of any of Aspects 43 to 48, wherein the AWG is a first AWG and the ridge is a first ridge, and further comprising: another of the AWG and another of the ridge to define a second AWG having a second ridge; the second AWG and the second ridge being disposed, respectively, parallel to the first AWG and the first ridge; wherein the first end of the first AWG is conjoined with a first end of the second AWG via a power divider junction, such that the first signal port is a common signal port to both the first AWG and the second AWG; wherein the second signal port is disposed at the second end of the first AWG, and further comprising a third signal port disposed at a second end of the second AWG, the second end of the second AWG disposed at a distance from the first end of the second AWG; wherein the first AWG and the second AWG are separated by an electrically conductive wall disposed therebetween, the electrically conductive wall extending between and electrically connected to the floor and the ceiling of the first AWG and the second AWG.

Aspect 50. The EM apparatus of Aspect 49, wherein: the power divider junction is a 3 dB power divider junction.

Aspect 51. The EM apparatus of Aspect 49, wherein: the first signal port is in signal communication with both the second signal port and the third signal port via the power divider junction.

Aspect 52. The EM apparatus of any of Aspects 49 to 51, wherein: the second signal port comprises a first elongated slotted aperture having a lengthwise direction of elongation across a width of the first AWG; and the third signal port comprises a second elongated slotted aperture having a lengthwise direction of elongation across a width of the second AWG.

Aspect 53. The EM apparatus of Aspect 52, further comprising: a first dielectric resonator antenna, DRA, disposed at the second signal port over the first elongated slotted aperture; and a second DRA disposed at the third signal port over the second elongated slotted aperture.

Aspect 54. The EM apparatus of Aspect 53, further comprising: a first dielectric beam shaper disposed on top of the first DRA; and a second dielectric beam shaper disposed on top of the second DRA.

Aspect 55. The EM apparatus of Aspect 54, wherein: the first dielectric beam shaper completely envelopes the first DRA; and the second dielectric beam shaper completely envelopes the second DRA.

Aspect 56. The EM apparatus of any of Aspects 54 to 55, wherein: the first DRA has an overall height A1, the first dielectric beam shaper has an overall height B1, and B1>A1; and the second DRA has an overall height A2, the second dielectric beam shaper has an overall height B2, and B2>A2.

Aspect 57. The EM apparatus of Aspect 56, wherein: B1 is equal to or greater than 2 times A1; and B2 is equal to or greater than 2 times A2.

Aspect 58. The EM apparatus of any of Aspects 54 to 57, wherein: the second DRA has a same shape, size, and composition, as the first DRA; and the second dielectric beam shaper has a same shape, size, and composition, as the first dielectric beam shaper.

Aspect 59. The EM apparatus of any of Aspects 54 to 58, wherein the first AWG and the second AWG in combination provide a first portion of the EM apparatus, and further comprising: a second portion disposed on top of the first portion, the second portion comprising a first top-down recess that is axially centrally aligned with the first elongated slotted aperture of the first portion, and a second top-down recess that is axially centrally aligned with the second elongated slotted aperture of the first portion; wherein the second portion, including the first and second top-down recesses, comprises electrically conductive surfaces.

Aspect 60. The EM apparatus of Aspect 59, wherein: the first and second top-down recesses with electrically conductive surfaces form EM reflectors.

Aspect 61. The EM apparatus of any one of Aspects 59 to 60, wherein: the second portion has an overall height H2; each one of the first top-down recess and the second top-down recess has a corresponding floor at a depth d2 where d2<H2; and each corresponding floor has an aperture that mimics a corresponding one of the first elongated slotted aperture and the second elongated slotted aperture of the first portion.

Aspect 62. The EM apparatus of any one of Aspects 59 to 61, wherein: the first DRA is disposed within the first top-down recess, and the second DRA is disposed within the second top-down recess.

Aspect 63. The EM apparatus of any one of Aspects 59 to 62, wherein: the first dielectric beam shaper is disposed within the first top-down recess, and the second dielectric beam shaper is disposed in the second top-down recess.

Aspect 64. The EM apparatus of any of Aspects 49 to 63, further comprising: a coaxial signal feed disposed at the power divider junction.

Aspect 65. The EM apparatus of any of Aspects 43 to 48, wherein the AWG is a first AWG and the ridge is a first ridge, and further comprising: another of the AWG and another of the ridge to define a second AWG having a second ridge; the second AWG and the second ridge being disposed, respectively, parallel to the first AWG and the first ridge; wherein the first end of the first AWG is conjoined with a first end of the second AWG via a power divider junction, such that the first signal port is a common signal port to both the first AWG and the second AWG; wherein the second signal port is disposed at an intermediate distance between the first end and the second end of the first AWG, and further comprising a third signal port disposed at an intermediate distance between the first end and the a second end of the second AWG, the second end of the second AWG disposed at a distance from the first end of the second AWG; wherein the first AWG and the second AWG are separated by an electrically conductive wall disposed therebetween, the electrically conductive wall extending between and electrically connected to the floor and the ceiling of the first AWG and the second AWG.

Aspect 66. The EM apparatus of Aspect 65, wherein: the second signal port comprises a first elongated slotted aperture having a lengthwise direction of elongation across a width of the first AWG; and the third signal port comprises a second elongated slotted aperture having a lengthwise direction of elongation across a width of the second AWG.

Aspect 67. The EM apparatus of Aspect 66, further comprising: a first dielectric resonator antenna, DRA, disposed at the second signal port over the first elongated slotted aperture; and a second DRA disposed at the third signal port over the second elongated slotted aperture.

Aspect 68. The EM apparatus of Aspect 67, further comprising: a first dielectric beam shaper disposed on top of the first DRA; and a second dielectric beam shaper disposed on top of the second DRA.

Aspect 69. The EM apparatus of Aspect 68, wherein: the first dielectric beam shaper completely encloses the first DRA; and the second dielectric beam shaper completely encloses the second DRA.

Aspect 70. The EM apparatus of any of Aspects 68 to 69, wherein: the first DRA has an overall height A1, the first dielectric beam shaper has an overall height B1, and B1>A1; and the second DRA has an overall height A2, the second dielectric beam shaper has an overall height B2, and B2>A2.

Aspect 71. The EM apparatus of Aspect 70, wherein: B1 is equal to or greater than 2 times A1; and B2 is equal to or greater than 2 times A2.

Aspect 72. The EM apparatus of any of Aspects 68 to 71, wherein: the second DRA has a same shape, size, and composition, as the first DRA; and the second dielectric beam shaper has a same shape, size, and composition, as the first dielectric beam shaper.

Aspect 73. The EM apparatus of any of Aspects 68 to 72, wherein the first AWG and the second AWG in combination provide a first portion of the EM apparatus, and further comprising: a second portion disposed on top of the first portion, the second portion comprising a first top-down recess that is axially centrally aligned with the first elongated slotted aperture of the first portion, and a second top-down recess that is axially centrally aligned with the second elongated slotted aperture of the first portion; wherein the second portion, including the first and second top-down recesses, comprises electrically conductive surfaces.

Aspect 74. The EM apparatus of Aspect 73, wherein: the first and second top-down recesses with electrically conductive surfaces form EM reflectors.

Aspect 75. The EM apparatus of any one of Aspects 73 to 74, wherein: the second portion has an overall height H2; each one of the first top-down recess and the second top-down recess has a corresponding floor at a depth d2 where d2<H2; and each corresponding floor has an aperture that mimics a corresponding one of the first elongated slotted aperture and the second elongated slotted aperture of the first portion.

Aspect 76. The EM apparatus of any one of Aspects 73 to 75, wherein: the first DRA is disposed within the first top-down recess, and the second DRA is disposed within the second top-down recess.

Aspect 77. The EM apparatus of any one of Aspects 73 to 76, wherein: the first dielectric beam shaper is disposed within the first top-down recess, and the second dielectric beam shaper is disposed in the second top-down recess.

Aspect 78. The EM apparatus of any of Aspects 65 to 77, further comprising: a signal feed disposed at the first signal port.

Aspect 79. The EM apparatus of any one of the foregoing Aspects, wherein: the AWG is at least partially loaded with a dielectric loading material.

Aspect 80. The EM apparatus of Aspect 79, wherein: the dielectric loading material has an average dielectric constant equal to or greater than 2 and equal to or less than 15.

Aspect 81. An electromagnetic, EM, apparatus, comprising: a first portion comprising an EM waveguide having in internal overall height H, the waveguide comprising a centrally disposed ridge with a height h that extends from an electrically conductive floor of the waveguide toward an electrically conductive ceiling of the waveguide, wherein h<H; a second portion disposed on and electrically connected to the first portion, the second portion comprising a recess surrounded by an electrically conductive material that is electrically connected with the first portion, the recess configured to receive a dielectric resonator antenna; wherein the waveguide comprises first EM paths on each side of the ridge, and a second EM path above the ridge, wherein the first EM paths are at least partially loaded with a dielectric loading material.

While certain combinations of individual features have been described and illustrated herein, it will be appreciated that these certain combinations of features are for illustration purposes only and that any combination of any of such individual features may be employed in accordance with an embodiment, whether or not such combination is explicitly illustrated, and consistent with the disclosure herein. Any and all such combinations of features as disclosed herein are contemplated herein, are considered to be within the understanding of one skilled in the art when considering the application as a whole, and are considered to be within the scope of the invention disclosed herein, as long as they fall within the scope of the invention defined by the appended claims, in a manner that would be understood by one skilled in the art.

While an invention has been described herein with reference to example embodiments, it will be understood by those skilled in the art that various changes may be made and equivalents may be substituted for elements thereof without departing from the scope of the claims. Many modifications may be made to adapt a particular situation or material to the teachings of the invention without departing from the essential scope thereof. Therefore, it is intended that the invention not be limited to the particular embodiment or embodiments disclosed herein as the best or only mode contemplated for carrying out this invention, but that the invention will include all embodiments falling within the scope of the appended claims. In the drawings and the description, there have been disclosed example embodiments and, although specific terms and/or dimensions may have been employed, they are unless otherwise stated used in a generic, exemplary and/or descriptive sense only and not for purposes of limitation, the scope of the claims therefore not being so limited. When an element such as a layer, film, region, substrate, or other described feature is referred to as being "on" or in "engagement with" another element, it can be directly on or engaged with the other element, or intervening elements may also be present. In contrast, when an element is referred to as being "directly on" or "directly engaged with" another element, there are no intervening elements present. The use of the terms first, second, etc. do not denote any order or importance, but rather the terms first, second, etc. are used to distinguish one element from another. The use of the terms a, an, etc. do not denote a limitation of quantity, but rather denote the presence of at least one of the referenced item. The use of the terms "top", "bottom", "up", "down", "left", "right", "front", "back", etc. do not denote a limitation of structure, as the structure may be viewed from more than one orientation, but rather denote a relative structural relationship between one or more of the associated features as disclosed herein. The term "comprising" as used herein does not exclude the possible inclusion of one or more additional features. And, any background information provided herein is provided to reveal information believed by the applicant to be of possible relevance to the invention disclosed herein. No admission is necessarily intended, nor should be construed, that any of such background information constitutes prior art against an embodiment of the invention disclosed herein.

The invention claimed is:

1. An electromagnetic, EM, apparatus, comprising:
a first portion comprising a first mating surface; and
a second portion comprising a second mating surface configured to be disposed on the first mating surface of the first portion;
wherein the first portion has an overall height H1, the first portion comprising:
an open-top structure having an upper surface profile having at least one top-down cavity comprising air and having a depth d1 where d1<H1;
wherein each of the at least one top-down cavity has corresponding side walls;
wherein outer exposed surfaces of the at least one top-down cavity with the corresponding side walls comprises an electrical conductor;
wherein corresponding ones of the at least one top-down cavity with the corresponding side walls forms a lower portion of an air waveguide, AWG;
wherein the second portion has an overall height H2, the second portion comprising:
a lower surface profile configured to mate with the upper surface profile of the first portion;
an upper surface profile having a plurality of top-down recesses, each of the top-down recesses extending to a plurality of floors at a depth d2 where d2<H2;
a plurality of bottom openings, each of the bottom openings separating a pair of floors among the plurality of floors;
wherein each of the top-down recess is at least partially filled with a dielectric medium having a relative dielectric constant greater than that of air that covers a corresponding bottom opening among the plurality of bottom openings;
wherein portions of the lower surface profile proximate each of the bottom openings comprises an electrical conductor and forms an upper portion of the AWG.

2. The EM apparatus of claim 1, wherein:
each of the dielectric medium is disposed on top of an adhesive, wherein the corresponding dielectric medium, adhesive, or combination of dielectric medium and adhesive, is disposed on the corresponding floor of each respective top-down recess and in each bottom opening of each corresponding floor.

3. The EM apparatus of claim 1, wherein:
at least one of the first portion and the second portion comprises a metallized plastic.

4. The EM apparatus of claim 1, wherein:
at least one of the first portion and the second portion comprises a composite of multiple portions attached to each other.

5. The EM apparatus of claim 1, wherein:
each of the at least one top-down recesses comprises a wall that surrounds a respective one of the dielectric medium disposed therein.

6. The EM apparatus of claim 1, wherein:
surfaces of each of the top-down recesses, including the corresponding surrounding wall and corresponding floor, comprises an electrical conductor.

7. The EM apparatus of claim 6, wherein:
the surrounding wall, with the electrical conductor, of each respective top-down recess forms an electrically conductive electromagnetic, EM, reflector that substantially surrounds the dielectric medium disposed within the corresponding top-down recess.

8. The EM apparatus of claim 1, wherein:
the second portion is attached to the first portion at the first and second mating surfaces.

9. The EM apparatus of claim 1, wherein:
the first portion, at a top surface of the side walls of corresponding ones of the at least one top-down cavity, further comprises an interlocking engagement feature; and
the second portion, at the lower surface of the second portion proximate the interlocking engagement feature of the first portion, further comprises a complementary interlocking engagement element configured to interlock with a corresponding interlocking engagement feature of the first portion.

10. The EM apparatus of claim 9, wherein:
the interlocking engagement feature of the first portion comprises an engagement recess, and wherein the complementary interlocking engagement element of the second portion comprises an engagement projection configured to fittingly engage with the engagement recess of the first portion.

11. The EM apparatus of claim 10, wherein:
each of the dielectric medium has a relative dielectric constant equal to or greater than 2 and equal to or less than 15.

12. The EM apparatus of claim 1, wherein the first portion further comprises:
a ridge projection having a height h1, where h1<d1, disposed within each of the at least one top-down cavity, the ridge projection having electrically conductive surfaces.

13. The EM apparatus of claim 12, wherein:
each respective ridge projection is disposed in an opposing relationship with a corresponding one of the bottom opening in each respective floor of the top-down recesses of the second portion.

14. The EM apparatus of claim 1, wherein:
each of the dielectric medium is integrally connected to another adjacent one of the dielectric medium by a relatively thin connecting structure to form a monolithic dielectric medium structure.

15. The EM apparatus of claim 1, wherein:
each of the bottom opening in the plurality of floors below the top-down recesses forms an electromagnetic, EM, signal feed aperture.

16. The EM apparatus of claim 1, wherein:
the second portion is formed completely of metal.

17. The EM apparatus of claim 1, wherein:
the second portion is formed from a metal-coated dielectric material.

18. The EM apparatus of claim 1, wherein:
the second portion is formed from a metal-coated molded or 3D printed dielectric material.

19. The EM apparatus of claim 1, wherein:
each of the top-down recesses has tapered sidewalls that taper inward from top-to-bottom; and
wherein each of the dielectric medium has a 3D shape that conforms to the tapered sidewalls of a corresponding one of the top-down recesses.

20. The EM apparatus of claim 1, wherein:
each of the dielectric medium has a 3D shape in the form of a trapezoidal prism.

* * * * *